US012738121B2

(12) United States Patent
Hammonds et al.

(10) Patent No.: US 12,738,121 B2
(45) **Date of Patent: *Sep. 15, 2026**

(54) SELF-CONTAINED AND DEMAND-ADAPTABLE WARMER FOR STORING, HEATING, AND HOLDING READY-TO-DRINK BEVERAGES

(71) Applicant: THE COCA-COLA COMPANY, Atlanta, GA (US)

(72) Inventors: Marcus Hammonds, Chamblee, GA (US); Michael Winterhalter, Nokomis, FL (US); Philip Fawcus, Cambridgeshire (GB); Paul Edward May, Attleborough (GB); Julian Brandon-Jones, Cambridgeshire (GB)

(73) Assignee: THE COCA-COLA COMPANY, Atlanta, GA (US)

(*) Notice: Subject to any disclaimer, the term of this patent is extended or adjusted under 35 U.S.C. 154(b) by 270 days.

This patent is subject to a terminal disclaimer.

(21) Appl. No.: 17/924,869

(22) PCT Filed: May 13, 2021

(86) PCT No.: PCT/US2021/032231

§ 371 (c)(1),
(2) Date: Nov. 11, 2022

(87) PCT Pub. No.: WO2021/231714

PCT Pub. Date: Nov. 18, 2021

(65) Prior Publication Data

US 2023/0196864 A1 Jun. 22, 2023

Related U.S. Application Data

(60) Provisional application No. 63/024,188, filed on May 13, 2020.

(51) Int. Cl.
*B65G 43/08* (2006.01)
*B65G 65/36* (2006.01)
(Continued)

(52) U.S. Cl.
CPC .............. *G07F 9/105* (2013.01); *G07F 11/28* (2013.01)

(58) Field of Classification Search
CPC ................................ G07F 9/105; G07F 11/28
See application file for complete search history.

(56) References Cited

U.S. PATENT DOCUMENTS 4,248,358 A 2/1981 Muench
4,705,176 A * 11/1987 Oden ...................... G07F 11/10 221/176
(Continued)

FOREIGN PATENT DOCUMENTS

JP H4-010097 A 1/1992
JP 2000276647 A 10/2000
(Continued)

OTHER PUBLICATIONS

English translation of Decision to Grant issue in JP 2022-567335, mailed Jan. 24, 2025.
(Continued)

*Primary Examiner* — Gene O Crawford
*Assistant Examiner* — Kelvin L Randall, Jr.
(74) *Attorney, Agent, or Firm* — Meunier Carlin & Curfman LLC

(57) ABSTRACT

A beverage warmer comprises a plurality of product shelves, where each product shelf has a plurality of product lanes. Each product lane has an ambient area, a heating area, and a serving area. A product is loaded into the beverage warmer in the ambient area of a product lane and transported through each of the heating area and serving area in response to a
(Continued)

product being removed from the beverage warmer. The product may be maintained in the heating area for a period of time and subject to a first temperature. Upon expiration of the period of time, the product is transported from the heating area to the serving area. The product is maintained in the serving area at a second temperature, where the second temperature is lower than the first temperature.

19 Claims, 25 Drawing Sheets

(51) Int. Cl.

| | |
|---|---|
| ***B65G 65/38*** | (2006.01) |
| ***G07F 9/10*** | (2006.01) |
| ***G07F 11/28*** | (2006.01) |

(56) References Cited

U.S. PATENT DOCUMENTS

| | | | | |
|---|---|---|---|---|
| 5,163,356 | A | 11/1992 | Chigira | |
| 6,510,962 | B1 * | 1/2003 | Lim | G07F 17/0014 700/243 |
| 8,695,872 | B2 * | 4/2014 | Braunstein | G07F 9/026 235/379 |
| 11,900,756 | B2 * | 2/2024 | Bhutani | G07F 11/16 |
| 2002/0174775 | A1 * | 11/2002 | Takatsuki | A47J 31/4432 99/279 |
| 2006/0106489 | A1 * | 5/2006 | Zito, Jr. | G07F 9/006 700/231 |
| 2008/0067187 | A1 * | 3/2008 | Rudick | A47F 1/06 221/123 |
| 2008/0098761 | A1 | 5/2008 | Zangari et al. | |
| 2008/0142537 | A1 | 6/2008 | Howell et al. | |
| 2011/0186591 | A1 | 8/2011 | Pfister | |
| 2011/0315706 | A1 * | 12/2011 | Lockwood | A47F 3/002 221/155 |
| 2012/0000744 | A1 | 1/2012 | Roekens et al. | |
| 2013/0284758 | A1 | 10/2013 | Wittern, Jr. et al. | |
| 2016/0210807 | A1 | 7/2016 | Rosenthal et al. | |
| 2017/0372035 | A1 | 12/2017 | Cosgrove et al. | |
| 2018/0177310 | A1 * | 6/2018 | Roekens | A47F 3/0486 |
| 2018/0268640 | A1 * | 9/2018 | Tadika | G07F 9/105 |
| 2020/0107559 | A1 * | 4/2020 | Deshpande | A23G 9/22 |

FOREIGN PATENT DOCUMENTS

| | | | | |
|---|---|---|---|---|
| JP | 2001307213 | A | | 11/2001 |
| JP | 2002197529 | A | | 7/2002 |
| JP | 2002222455 | A | * | 8/2002 |
| JP | 2005-332114 | A | | 12/2005 |
| JP | 2015-135705 | A | | 7/2015 |

OTHER PUBLICATIONS

English translation of Japanese Office Action issued in JP 2022-567335, mailed Aug. 23, 2024.

International Search Report and Written Opinion issued in PCT/US/2021/032231, mailed Aug. 31, 2021.

Chinese Office Action on Application No. 2021800478045, dated Jan. 1, 2026, 19 pages.

Extended European Search Report issued in EP21803608.5, mailed Feb. 15, 2024.

* cited by examiner

SELF-CONTAINED AND DEMAND-ADAPTABLE WARMER FOR STORING, HEATING, AND HOLDING READY-TO-DRINK BEVERAGES

CROSS-REFERENCE TO RELATED APPLICATIONS

This application is a national phase entry under 35 U.S.C. § 371 of International Application No. PCT/US2021/032231, filed on May 13, 2021, which claims the benefit of U.S. Provisional Application Ser. No. 63/024,188 filed May 13, 2020, the disclosures of which are expressly incorporated herein by reference.

BACKGROUND

Ready-to-drink (RTD) beverages, such as coffees or teas, are frequently served at elevated temperatures (e.g., 40-70 C). Current RTD beverage warmers heat all of the RTD beverages stored in a product cabinet to a target consumption temperature. Accordingly, all of the RTD beverages stored in the product cabinet are maintained at elevated temperatures. The shelf life of an RTD beverage is reduced when stored at elevated temperatures due to product spoilage and ingredient degradation leading to lower product quality over time. Therefore, current RTD beverage warmers lead to high spoilage rates due to maintaining large quantities of products at elevated temperatures for extended periods of time. Product spoilage leads to losses in the form of product buy-backs from retailers. Additionally, if consumer demand is high, products can sell out quickly and hours are required to have sellable product.

SUMMARY

In a first aspect of the disclosure, a beverage warmer comprises a product shelf with an ambient storage zone, a heating zone, and a serving zone. The product shelf comprises a first door between the storage zone and the heating zone and a second door between the heating zone and the serving zone. Each of the first and second doors configurable between an open and a closed position. The beverage warmer further comprises a controller configured to operate the first door to transport a product from the ambient storage zone through the heating zone and to operate the second door to transport the product from the heating zone to the serving zone.

In some implementations of the first aspect of the disclosure, the serving zone comprises a serving area sized to receive a first number of products.

In some implementations of the first aspect of the disclosure, the ambient storage zone comprises a loading area sized to receive a second number of products.

In some implementations of the first aspect of the disclosure, the second number of products is greater than the first number of products.

In some implementations of the first aspect of the disclosure, the heating zone comprises a heating area sized to receive a single product.

In some implementations of the first aspect of the disclosure, wherein the serving zone comprises a proximity sensor configured to detect whether a product is present at a location in the serving zone.

In some implementations of the first aspect of the disclosure, wherein the controller is configured to determine that a product has been removed from the serving zone in response to the proximity sensor detecting that a product is not present at the location after detecting that a product is present at the location.

In some implementations of the first aspect of the disclosure, the controller is further configured to operate the first door to transport a product from the ambient storage zone to the heating zone in response to determining that a product has been removed from the serving zone.

In some implementations of the first aspect of the disclosure, the second door comprises a wall with a portal therethrough, wherein the portal is positioned on a top portion of the wall.

In some implementations of the first aspect of the disclosure, the product shelf further comprises a plurality of product lanes, each of the product lanes extend through the ambient storage zone, the heating zone, and the serving zone.

In some implementations of the first aspect of the disclosure, the beverage warmer further comprises a plurality of product shelves.

In a second aspect of the disclosure, a method of operating a beverage warmer comprises receiving a product in a loading area of a product lane on a product shelf of the beverage warmer. The method comprises transporting the product through a first door from the loading area to a heating area. The method comprises heating the product in the heating area for a heating time at a heating temperature. The method comprises transporting the product through a second door from the heating area to a serving area after the heating time. The method comprises maintaining the product at a serving temperature in the serving area.

In some implementations of the second aspect of the disclosure, the method further comprises detecting whether a second product is in the loading area of the product lane. The method further comprises detecting that the product is removed from the serving area, and responsively transporting the second product through the first door from the loading area to the heating area.

In some implementations of the second aspect of the disclosure, heating the product in the heating area comprises heating the product with one or more heating elements in the heating area.

In some implementations of the second aspect of the disclosure, the one or more heating elements comprises two heating elements are positioned on opposite sides of the heating area.

In some implementations of the second aspect of the disclosure, the method further comprises heating air in the serving area to the serving temperature with one or more heating elements in a serving zone that comprises the serving area.

In some implementations of the second aspect of the disclosure, the method further comprises circulating the heated air in the serving area with one or more fans positioned in the serving zone.

In some implementations of the second aspect of the disclosure, the method further comprises detecting that no products are present in the serving area. The method further comprises displaying a time on a display adjacent to the serving area. The time indicates an amount of time remaining until a heated product is transported through the second door from the heating area to a serving area.

In some implementations of the second aspect of the disclosure, the method further comprises detecting that the product is removed from the serving area. The method further comprises determining that a current time is during a low demand period, and responsively determining to not transport a second product through the first door from the loading area to the heating area.

In some implementations of the second aspect of the disclosure, transporting the product through the first door comprises rotating the first door and transporting the product through the second door comprises rotating the second door.

A third aspect of the disclosure includes a method of operating a beverage warmer based on a machine learning model of predicted demand patterns. The method comprises training a machine learning model that predicts a demand pattern for a future demand period. Training the machine learning model is based on a cost function that is a function of a ratio of a cost of a missed customer to a cost of a discarded product. The method comprises operating a beverage warmer based on the predicted demand pattern.

In some implementations of the third aspect of the disclosure, the machine learning model is a random forest regression model.

In some implementations of the third aspect of the disclosure, the cost of a missed customer is greater than a cost of a discarded product.

In some implementations of the third aspect of the disclosure, a cost function for split decisions in the random forest regression model is:

$$\text{Regression: } P+(CR*\sigma_D),$$

where CR is the ratio, $\sigma_D$ is a standard deviation of historical demand for the demand period, and P is the baseline demand prediction based on historical demand data for the demand period.

In some implementations of the third aspect of the disclosure, the cost of a missed customer is less than a cost of a discarded product.

In some implementations of the third aspect of the disclosure, a cost function for split decisions in the random forest regression model is:

$$\text{Regression: } P-(CR*\sigma_D),$$

where CR is the ratio, $\sigma_D$ is a standard deviation of historical demand for the demand period, and P is the baseline demand prediction based on historical demand data for the demand period.

In some implementations of the third aspect of the disclosure, operating the beverage warmer comprises transporting a product from an ambient storage zone to a heating zone to heat the product based on the demand pattern.

In some implementations of the third aspect of the disclosure, operating the beverage warmer comprises maintaining a product in an ambient storage zone without heating the product based on the demand pattern predicting a period of low demand.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
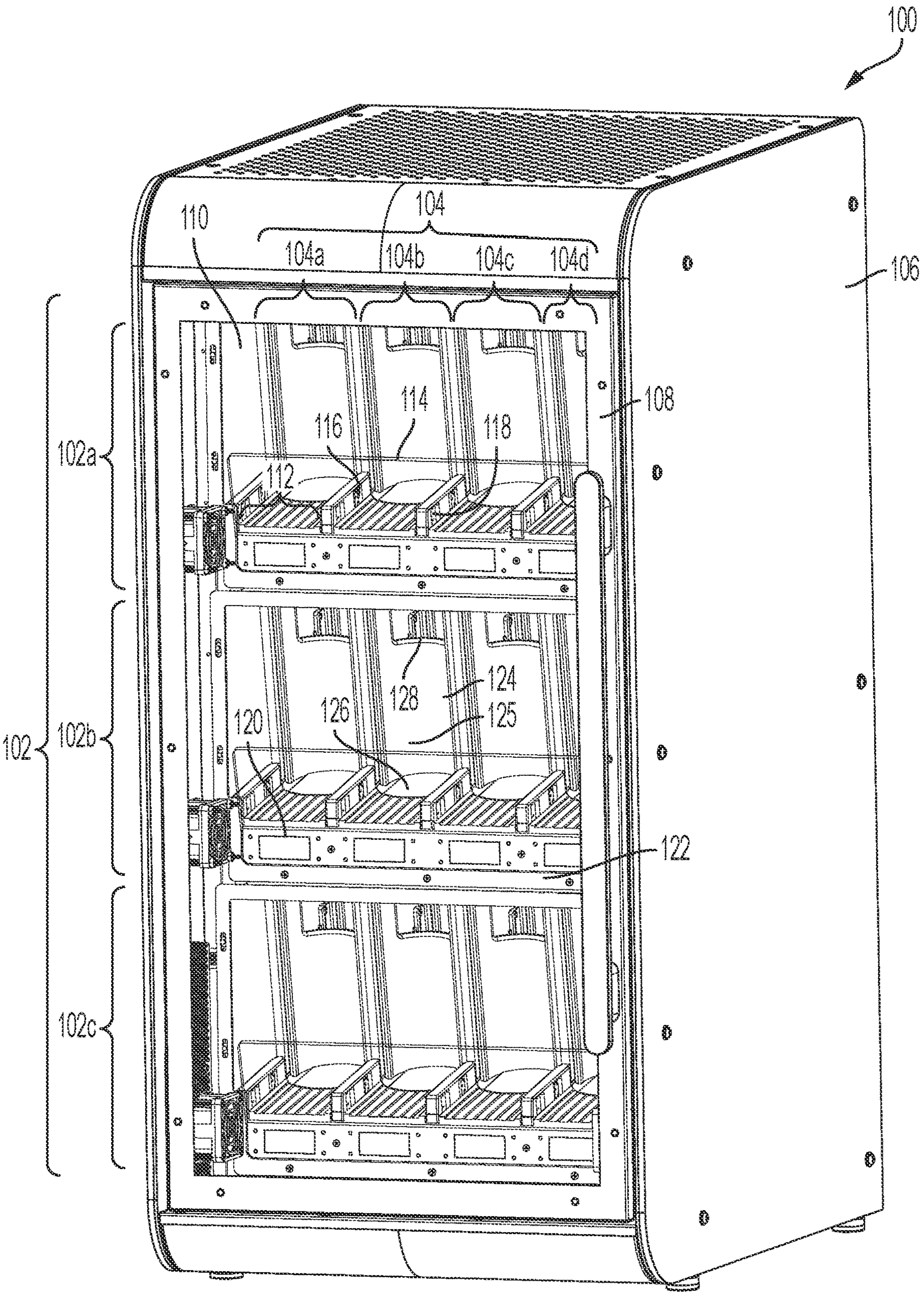
FIGS. 1A-1E illustrates various view of a beverage warmer according to various embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A", "B", and/or "C" means "A", or "B", or "C", or "A and B", or "A and C", or "A and B and C".

A beverage warmer comprises a plurality of product shelves, where each product shelf has a plurality of product lanes. Each product lane has an ambient area, a heating area, and a serving area. A first number of ready-to-drink (RTD) beverage products are loaded into the beverage warmer in the ambient area of a product lane and transported through each of the heating area and serving area as products are removed from the beverage warmer. For example, in response to detecting that a product is removed from the serving area in a product lane, a product that is stored in the ambient area may be transported to the heating area. The RTD beverage products may include PET or aluminum packaging. The product may be maintained in the heating area for a period of time and subject to a first temperature, for example 80° C. Other heating temperatures may be used in the heating area, such as between 30-100° C. The first temperature may be set to quickly heat RTD products without causing deformation in packaging. Upon expiration of the period of time, the product is transported from the heating area to the serving area. The product is maintained in the serving area at a second temperature, where the second temperature is lower than the first temperature, for example 60° C. The second temperature may be set to a consumption temperature for the RTD products. Other product serving temperatures may be used in the serving area, such as between 30-100° C. A second number of RTD products may be maintained within the serving area of the product lane, where the second number of products is less than the first number of products. In an example, the first number of products maintained in the ambient area of the product lane is three products and the second number of products maintained in the serving area of the product lane is two products. More or fewer numbers of products may be maintained in each of the ambient and/or serving areas. Accordingly, fewer products in the beverage warmer are subject to an elevated temperature, thereby leading to lower rates of product spoilage and lower losses from product buy-backs.

FIGS. 1A-1E illustrates various view of a beverage warmer 100 according to various embodiments of the disclosure. The beverage warmer 100 comprises a first product shelf 102*a*, a second product shelf 102*b*, and a third product shelf 102*c*, collectively product shelves 102. The beverage warmer 100 may have more or fewer product shelves 102. The first product shelf 102*a* comprises a first product lane 104*a*, a second product lane 104*b*, a third product lane 104*c*, and a fourth product lane 104*d*, collectively product shelves 104. The beverage warmer 100 may have more or fewer product lanes 104 on each of the product shelves 102. In the example shown, each of the second and third product shelves 102*b*, 102*c* have the same number of product lanes 104 as the first product shelf 102*a*. In other examples, one or more of the second and third product shelves 102*b*, 102*c* may have a different number of product lanes 104 as the first product shelf 102*a*. For example, some product lanes 104 may be wider or narrower depending on product dimensions, thereby leading to different numbers of product lanes 104.

The product shelves 102 are positioned within a housing 106. A front door 108 provides access through the housing 106 to products maintained in a serving zone 110. Within the serving zone 110, each of the product lanes 104 comprise a serving area 112. The serving area 112 is sized to receive one or more products. In an example, the serving area 112 is sized to receive two products. In the example shown, the front door 108 provides access to the serving zone 110 for all of the product shelves 102 of the beverage warmer 100. The products may be ready-to-drink (RTD) beverage products in PET or aluminum packaging so as to provide hot beverages options that are available for immediate consumption. In some implementations other products may be used with the beverage warmer 100, such as soups or other consumable products for immediate consumption at an elevated temperature.

In some implementations, one or more insulating barriers may be positioned between one or more of the product lanes 104 on a product shelf 102 so that products may be maintained at different temperatures in different product lanes. Likewise, one or more insulating barriers may be positioned between one or more of the product shelves 102 so that products may be maintained at different temperatures on different product shelves 102. In some implementations, one or more product barriers may be positioned between product lanes 104 and product shelves 102 so that each of the product lanes may maintain a product at a distinct temperatures. Each of the insulating barriers may contact the front door 108 or be positioned proximate (e.g., within 5 mm) to the front door 108 so as to maintain distinct product temperature zones described above.

In some implementations, the product shelves 102 are sloped at an angle to promote gravity fed positioning of products along the product lanes 104. At an end of the serving area 112 is a product barrier 114 adapted to prevent products traveling along the product lanes 104 from falling. In the example shown, the product barrier 114 spans across each of the product shelves 102. In alternate implementations, products may be transported along product shelves 102 by any other means such as vibratory tables, rollers, conveyor belts, or any combination of gravity, vibratory tables, rollers, conveyor belts and/or any other such known product transportation mechanisms.

In some implementations, a product sanitizer (not shown) may be positioned about the serving area 112. For example, a UV light, sanitizing spray, or other sanitizing mechanism may be applied to products positioned in the serving area 112. In some implementations, the product sanitizer may be positioned about the serving area 112 for each of the product lanes 104. Upon a new product entering the serving area 112, the product sanitizer may be activated for a predetermined period of time to sanitize the packaging of the new product (e.g., a UV light may be turned on fora predetermined period of time).

The serving area 112 comprises a proximity sensor 116 adapted to detect the presence of a product in the serving area 112. The proximity sensor 116 may be an infrared emitter and infrared sensor positioned on opposite sides of the serving area 112. The proximity sensor 116 may alternatively be an electromagnetic sensor, sonic sensor, or any other proximity sensor. The proximity sensor 116 is positioned at an end of the serving area 112 opposite the product barrier 114. Accordingly, the proximity sensor 116 detects whether the serving area 112 is at capacity. In the example show, the proximity sensor detects whether the serving area 112 has two products positioned thereon.

In some implementations, the proximity sensor 116 is used to determine a number of products present in the serving area 112. For example, each time the proximity sensor 116 detects a product, a product count may be incremented. The product count may be used to control heating of additional products, as described in more detail below. Upon reaching a capacity of the serving area 112, the proximity sensor 116 may be used to prevent heating of additional products for maintaining on the serving area 112. Upon a product being removed from the serving area 112, the proximity sensor 116 may be used to determine that additional capacity is available in the serving area 112 and another product may be heated.

In some implementations, the product serving area 112 comprises a second proximity sensor 118 positioned between the proximity sensor 116 and the second proximity sensor 118. The second proximity sensor 118 is adapted to detect whether any products are positioned within the serving area 112. For example, if the second proximity sensor 118 detects that no products are present, then it is determined that no products are available in the serving area 112. Otherwise, if the second proximity sensor 118 detects that a product is present, then it is determined that at least one product is present in the serving area 112. In various implementations, one or more of the proximity sensor 116 and/or the second proximity sensor 118 may be optional or otherwise not present in the beverage warmer 100. In various implementations, the proximity sensor 116 and/or the proximity sensor 118 facilitate on-demand heating of products as they are consumed, thereby ensuring hot product availability while minimizing losses due to spoilage by limiting the number of heated products at a given time.

Each of the product lanes 104 has a corresponding display 120 positioned along a front face 122 of each of the product shelves 102. In the example shown, there are four displays 120, each corresponding to one of the product lanes 104. The product display 120 shows status information of a corresponding one of the product lanes 104. For example, when product(s) are present in the serving area 112, the display shows a temperature of the product(s). When product(s) are not present in the serving area 112, the display shows an amount of time remaining until a product will be heated and positioned in the serving area 112.

Each of the product lanes 104 has a corresponding heating outlet door 124. The heating outlet door 124 separates the serving area 112 from a heating area (e.g., heating area 318 best seen in FIG. 3F) of the product lane 104. In the example shown, the heating outlet door 124 comprises a base 126 sized to receive a product and a wall 125 that extends from the base 126. Within the wall is a portal 128 that extends through the wall 125 and provides a passageway between the heating area and the serving area 112. As described in more detail below, the portal 128 prevents excess heat from building up in the heating area that would otherwise lead to product deformation. For example, plastic bottles tend to be filled with product in such a way that there is an air gap in a neck of the bottle. Accordingly, heat may accumulate in the neck of a plastic bottle more quickly than areas of the bottle that are in contact with a liquid product, thereby leading to deformation of the bottle about the neck. The portal 128 allows for excess heat to be removed from the heating area to prevent deformation of the neck of a plastic bottle. The portal 128 is positioned at a top portion of the wall 125. In some implementations, the portal 128 extends from the top portion of the wall 125 towards a bottom of the wall 125 for a predetermined distance. For example, the predetermined distance may be 10%, 20%, 25%, 30%, 35%, 40%, 45%, or 50% of a total height of the wall 125. Other sizes of the portal 128 are contemplated by this disclosure. A bottom portion of the portal 128 is positioned along a wall at a height proximate to (e.g., at or within 5 mm) a bottle liquid fill level. While the portal 128 is shown as a single through passage between the heating area and the serving area 112, in various implementations, the portal 128 may take a different shape or be comprises of a plurality of holes or slots through the wall 125.

Figure 1B:
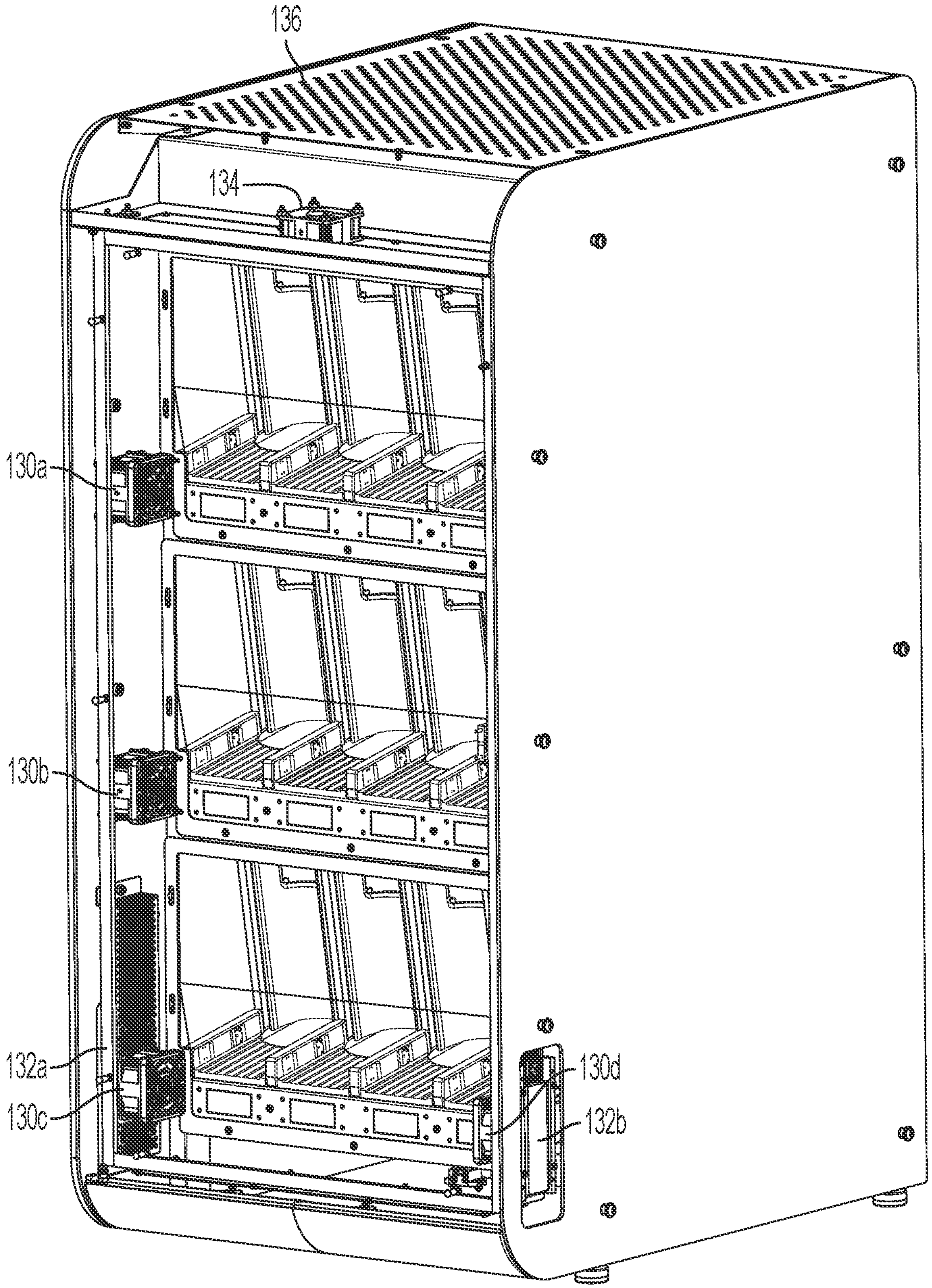

As best seen in FIG. 1B, the serving zone 110 comprises a plurality of circulation fans 130*a*, 130*b*, 130*c*, 130*d*, collectively circulation fans 130. Generally, the circulation fans 130 are positioned about each of the product shelves 102 within the serving zone 110. For example, the circulation fan 130*a* is positioned at the front face 122 of the product shelf 102*a*. While only the circulation fan 130*a* is positioned at the product shelf 102*a*, in some implementations, a circulation fan may be positioned at each side of the product shelf 102*a*. The circulation fans 130 operate to circulate air within the serving zone 110 for maintaining products at a first temperature.

The serving zone 110 also comprises a plurality of heating elements 132*a*, 132*b*, collectively heating elements 132. The heating elements 132 may be any type of heating element, such as a resistive or inductive heater. For example, the heating elements 132 may be a strip heater. Other types of heaters are contemplated by this disclosure, such as silicone, infrared, inductive, thin film resistive, thick film conductive, resistive, forced hot air heaters or convective heating and/or any combination thereof. The heating elements 132 are operated to maintain the serving zone 110 at the first temperature. While the heating elements 132 are shown on either size of the product shelf 102*c* more or fewer heating elements 132 may be used. For example, a single heating element 132 may be used. Alternatively, additional heating elements 132 may be positioned about more of the product shelves 102, such as product shelf 102*a* and/or product shelf 102*b*.

Should the front door 108 remain closed for a period of time, a temperature in the serving zone 110 may increase above the first temperature. For example, excess heat from the heating area may enter the serving zone 110 through the portals 128 on the heating outlet doors 124. In such circumstances, a vent fan 134 may be operated to vent the excess heat through a top surface 136 of the housing 106. As shown, the top surface 136 has perforations for allowing air circulated by the vent fan to be drawn from the serving zone 110 and supplied through the top surface 136 to an ambient environment. One or more temperature sensors (not shown) monitor a temperature of the serving zone 110 for controlling operation of the circulation fans 130, heating elements 132, and vent fan 134 to maintain the serving zone 110 at the first temperature.

Figure 1C:
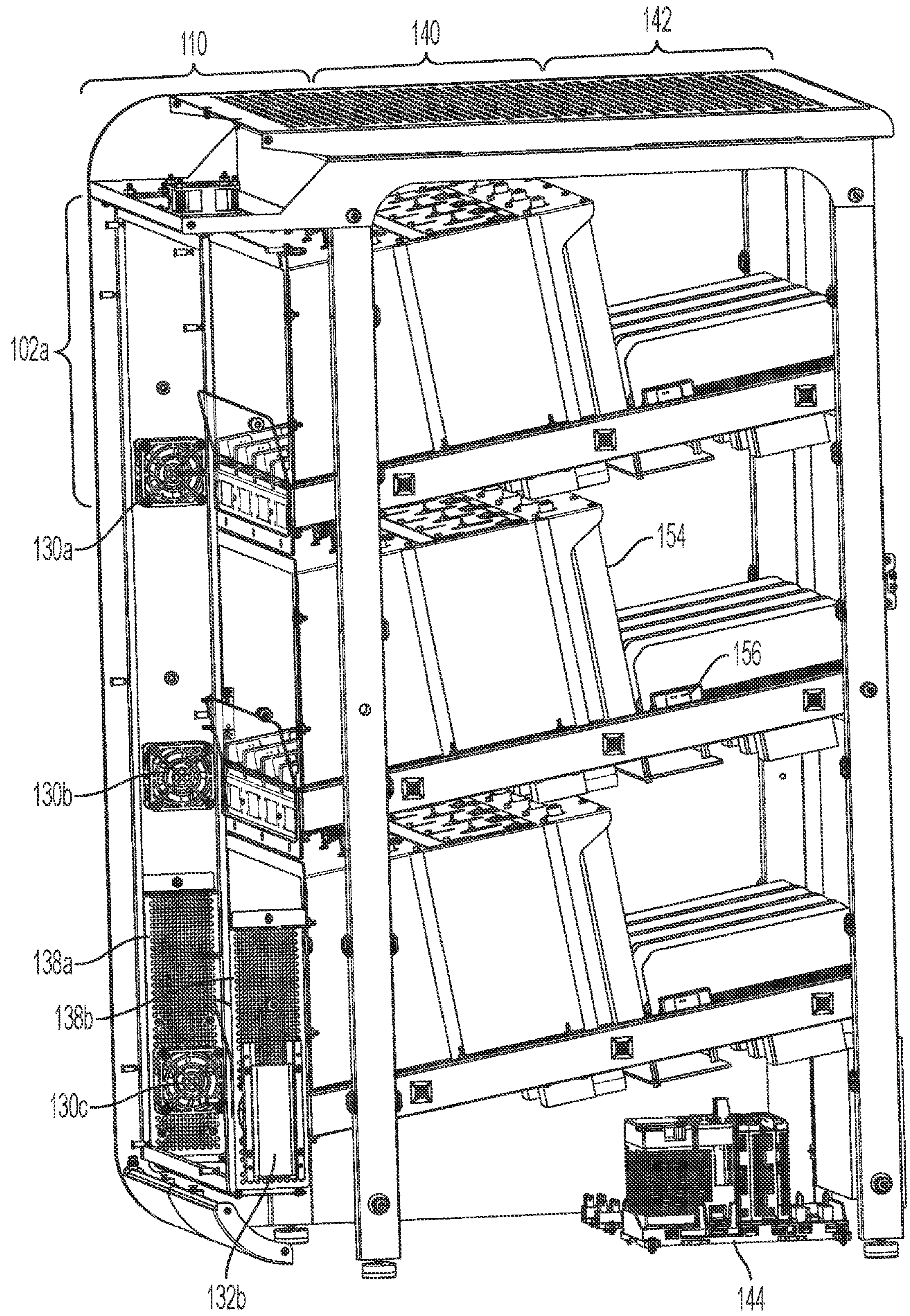

As shown in FIG. 1C, a heat shield 138*a* may be positioned between the heating element 132*a* and the circulation fan 130*c*. Likewise, a heat shield 138*b* may be positioned between the heating element 132*b* and the circulation fan 130*d*. The heat shields 138 prevent consumers from directly contacting the heating elements 132 when retrieving products from the serving zone 110.

As shown in FIG. 1C, the product shelves 102 extend across the depth of the beverage warmer 100 at an angle to promote gravity fed transportation of products to the serving zone 110 from a heating zone 140, and an ambient zone 142. For example, a product may be loaded into the ambient zone 142 of the beverage warmer 100 and gravity will transport the product to and through the heating zone 140 to the serving zone 110, as described in more detail below. A main controller 144, such as a programmable logic controller, controls various aspects of the beverage warmer 100, such as a temperature to be maintained in each of the ambient zone 142, the heating zone 140, and the serving zone 110, as well as operation of the circulation fans 130, the heating elements 132, and the vent fan 134, for example. Other components of the beverage warmer 100 are likewise controlled by the main controller 144 as described herein. As shown, the main controller 144 is positioned below the product shelf 102*c* at the ambient zone 142 of the beverage warmer 100 so as to limit exposure of the main controller 144 to heat generated by the beverage warmer 100.

Figure 1D:
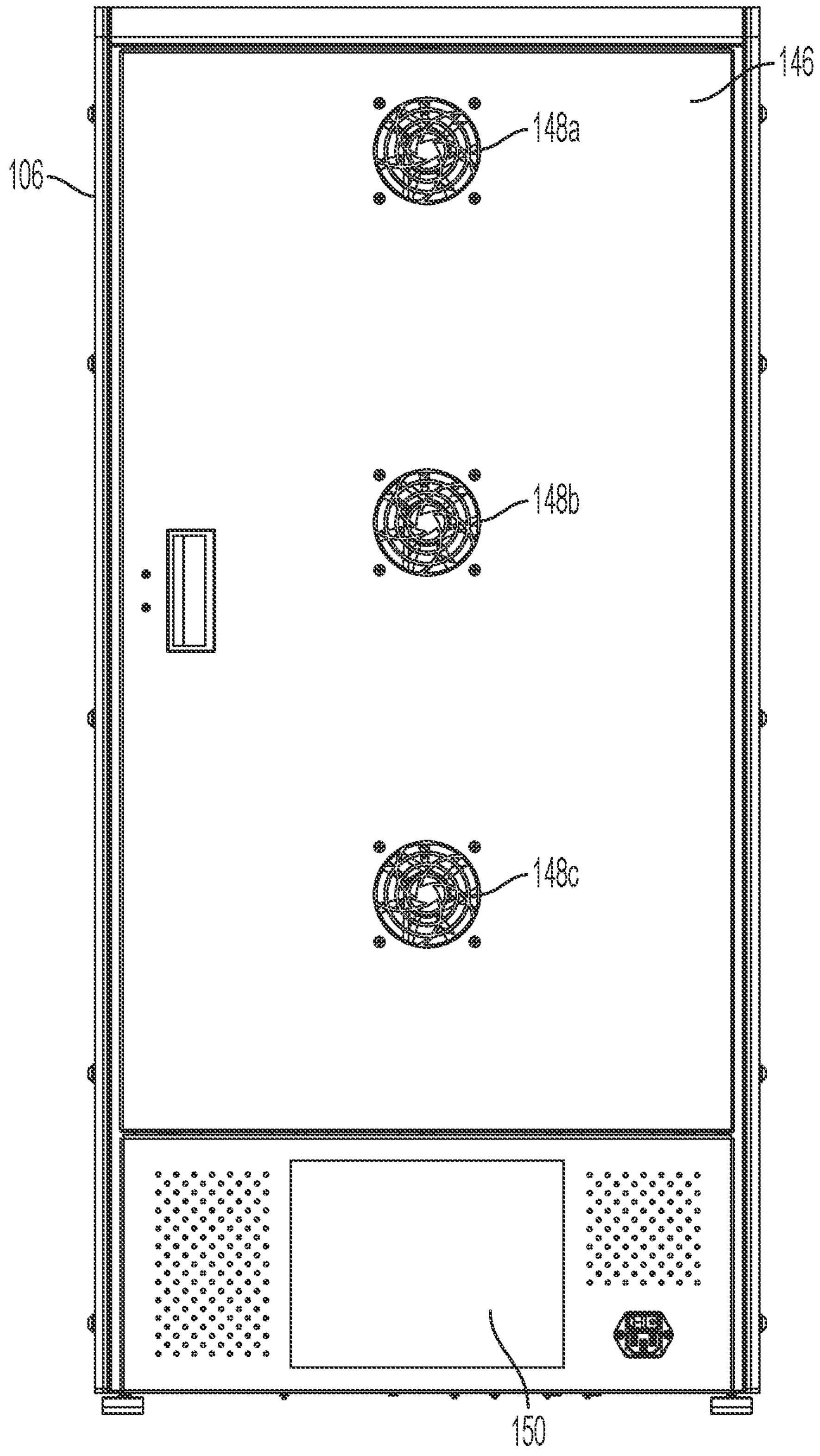

As shown in FIG. 1D a rear door 146 provides access through the housing 106 to the ambient zone 142 to allow loading products onto the product shelves 102. An ambient vent fan 148*a*, an ambient vent fan 148*b*, and an ambient vent fan 148*c*, collectively ambient vent fans 148, are positioned on the rear door 146 and configured to remove heat from the ambient zone 142. In the example shown, the ambient vent fans 148 are positioned along the rear door 146 at an upper end of each of the product shelves 102. In various implementations, the ambient vent fans 148 are configured to blow hot air our of the ambient zone 142 of the beverage warmer 100. In various implementations, one or more of the ambient vent fans 148 may be configured to draw ambient air into the ambient zone 142 of the beverage warmer 100. For example, the ambient vent fan 148*c* may be configured to draw ambient air into the ambient zone 142 while the ambient vent fans 148*a*, 148*b* are configured to blow hot air out of the ambient zone 142. The ambient vent fans 148*a* are controlled by the main controller 144 so as to maintain a temperature of ambient zone 142 at or below an ambient zone threshold temperature.

A user interface 150 is positioned below the rear door 146 and is coupled to the main controller 144 for modifying configuration settings of the beverage warmer. Accordingly, operation of the beverage warmer 100 is modified based on inputs received through the user interface 150. In various implementations, the user interface 150 is a touch-screen user interface. In other implementations, the user interface 150 may include a display and one or more buttons or keyboards for receiving user input. In other implementations, the user interface 150 may include a display and a port for communicating with an external terminal, such as an external keyboard for receiving user input. In other implementations, the user interface 150 may simply include a communication terminal, such as a serial port, for connecting to external equipment for displaying configuration settings of the beverage warmer 100 and supplying changed configuration settings to the main controller 144. Other types of user interfaces for receiving a current configuration status and changing configuration settings of the main controller 144 are contemplated by this disclosure.

Figure 1E:
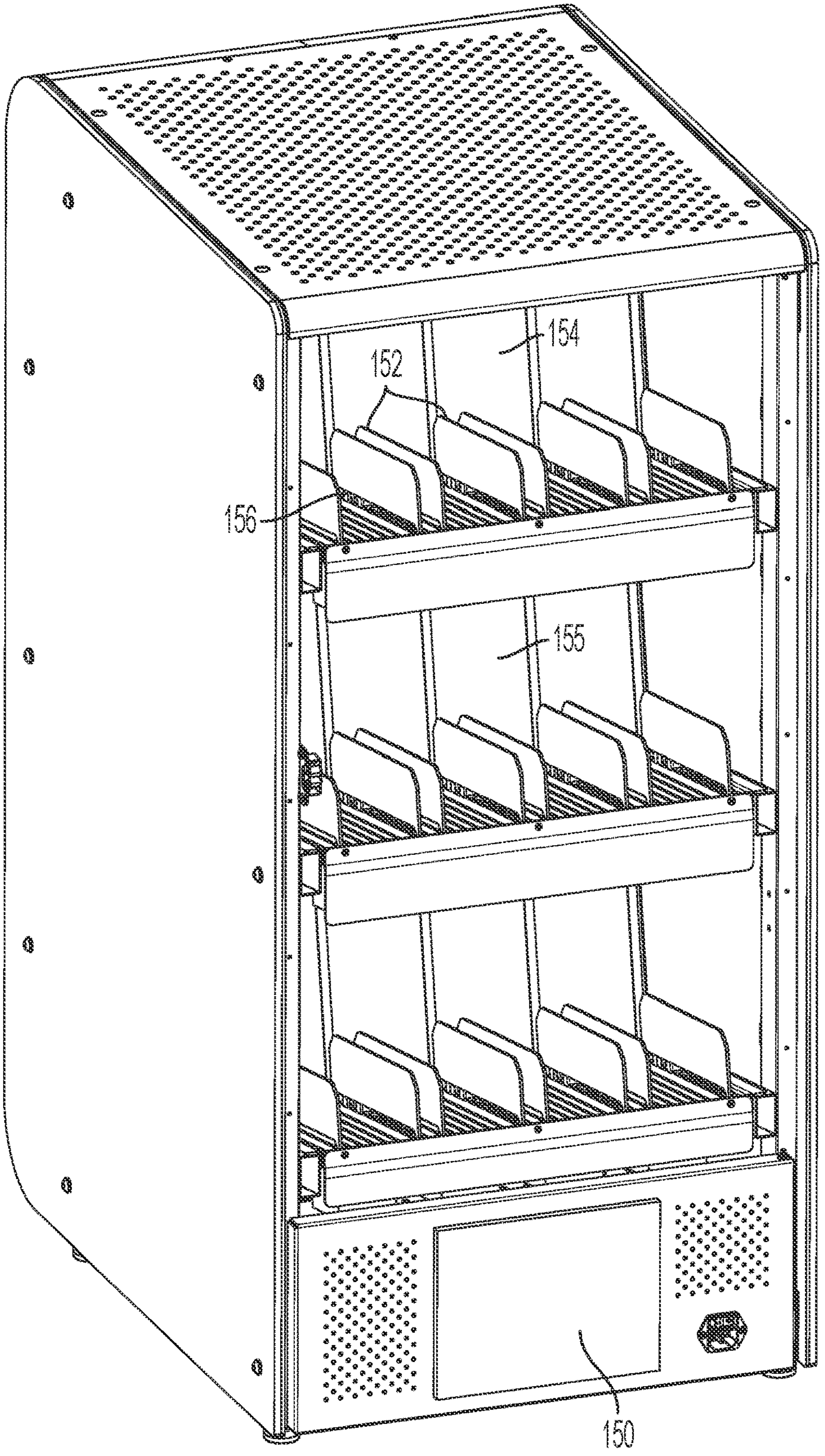

As shown in FIG. 1E, the beverage warmer 100 is shown with the rear door 146 removed to show details of the ambient zone 142, also shown in FIG. 1C. Within the ambient zone 142, each of the product lanes 104 comprise a loading area 152. The loading area 152 is sized to receive one or more products. In an example, the loading area 152 is sized to receive three products. More or fewer products may be positioned within the loading area 152. In various implementations, more products may be positioned within the loading area 152 that within the serving area 112. In the example shown, the rear door 146 provides access to the ambient zone 142 for all of the product shelves 102 of the beverage warmer 100. In some implementations, separate rear doors may be provided to access the ambient zone 142 for each of the product shelves 102.

In some implementations, the product shelves 102 are sloped at an angle to promote gravity fed positioning of products along the product lanes 104. At an end of the loading area 152 is a heating inlet door 154 adapted to prevent products traveling along the product lanes 104 from entering the heating zone 140 until desired. The heating inlet door 154 is adapted to selectively allow products in the loading area 152 to enter the heating zone 140. The heating inlet door 154 thermally insulates the ambient zone 142 from the heating zone 140, as discussed in more detail below. In alternate implementations, products may be transported along product shelves 102 by any other means such as vibratory tables, rollers, conveyor belts, or any combination of gravity, vibratory tables, rollers, conveyor belts and/or any other such known product transportation mechanisms.

In the example shown, the heating outlet door 124 and the heating inlet door 154 are rotating doors adapted to move products between the ambient zone 142, the heating zone 140, and the serving zone 110. In other implementations, the heating outlet door 124 and the heating inlet door 154 may be formed as a vertical or horizontal shutter, a bi-fold gate, or any other door structure.

The heating outlet door 124 comprise a semi-circular wall 125 that extends from a circular base 126. The heating outlet door 124 is initially positioned so that a convex side of the semi-circular wall 125 faces the heating zone 140. In this position, any product that is positioned with in the heating zone 140 is prevented from passing through the door 124. Upon a 180° rotation of the door 124 so that a concave side of the semi-circular wall 125 faces the heating zone 140, a product positioned within the heating zone 140 is allowed to enter the door 124 and rest on the base 126. The door 124 rotates so that a concave side of the semi-circular wall 125 faces the heating zone 140 in response to a product being located within the heating zone 140 for a predetermined heating time. Upon the product being transported to the base 126, the door 124 is rotated 180° so that the convex side of the semi-circular wall 125 again faces the heating zone 140. Accordingly, the product is transported from the base 126 to the serving area 112.

The heating inlet door 154 comprise a semi-circular wall 155 that extends from a circular base (shown in FIG. 3F below). The heating inlet door 154 is initially positioned so that a convex side of the semi-circular wall 155 faces the ambient zone 142. In this position, any product that is positioned with in the loading area 152 is prevented from passing through the door 154. Upon a 180° rotation of the door 154 so that a concave side of the semi-circular wall 155 faces the loading area 152, a product positioned within the loading area 152 is allowed to enter the door 154 and rest on the base. The door 154 rotates so that a concave side of the semi-circular wall 155 faces the loading area 152 in response to a product being removed from the serving area 112. In various implementations, the door 154 rotates after a predetermined wait time to allow for consumers to remove and replace products while deciding which product to select. Upon the product being transported to the base, the door 154 is rotated 180° so that the convex side of the semi-circular wall 155 again faces the loading area 152. Accordingly, the product is transported from the base to the heating zone 140.

The loading area 152 comprises a proximity sensor 156 adapted to detect the presence of a product in the loading area 152. The proximity sensor 156 may be an infrared emitter and infrared sensor positioned on opposite sides of the loading area 152. The proximity sensor 156 may alternatively be an electromagnetic sensor, sonic sensor, or any other proximity sensor. The proximity sensor 156 is positioned at the end of the loading area 152 with the heating inlet door 154. Accordingly, the proximity sensor 156 detects whether any products are located in the loading area 152.

In some implementations, the proximity sensor 156 may be positioned at an end of the loading area 152 that receives products. At this location, the proximity sensor 156 is used to determine a number of products present in the loading area 152. For example, each time the proximity sensor 156 detects a product, a product count may be incremented. Upon a product being removed from the serving area 112, the proximity sensor 156 may be used to determine that additional capacity is available in the loading area 152 to be heated. Accordingly, the proximity sensor 156 facilitates on-demand heating of products as they are consumed. In some implementations, only the proximity sensor 156 is used to maintain a count of product within each of the loading area 152 and the serving area 112. By using data-based algorithms to adjust the proportion of the total inventory that is maintained in the serving zone 110 vs the ambient zone 142, customers will be able to better maintain available hot product with changes in demand. The beverage warmer 100 knows when to heat product to make sure it is available for consumers when they wanted it. The beverage warmer 100 also is able to physically move products from the ambient zone 142, to the heating zone 140, to the serving zone 110. The decision determining the what percentage of a total capacity of the beverage warmer 100 is divided into the available zones is based on a series of algorithmically driven decisions using data collected from local, surrounding, & network supplied sources, such as prior sales, weather, etc.

In some implementations, the product loading area 152 comprises a second proximity sensor (not shown) positioned end of the loading area 152 that receives products. The second proximity sensor is adapted to detect whether the loading area 152 is at capacity. In various implementations, one or more of the proximity sensor 156 and/or the second proximity sensor in the ambient zone 142 may be optional or otherwise not present in the beverage warmer 100.

Figure 2:
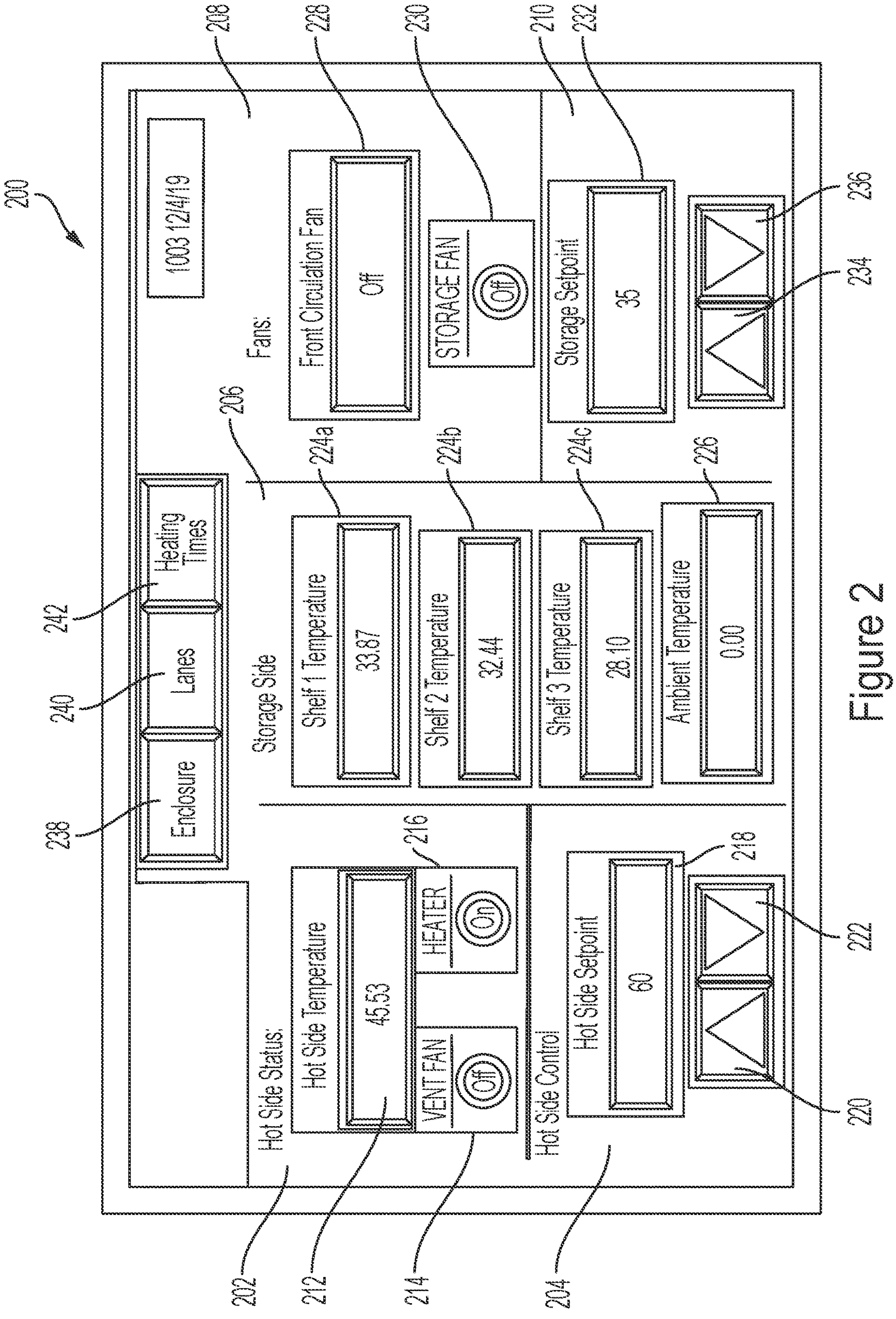
FIG. 2 illustrates an exemplary display screen for a user interface of the beverage warmer suitable for implementing the several embodiments of the disclosure.

FIG. 2 illustrates an exemplary display screen 200 for the user interface 150 of the beverage warmer 100 suitable for implementing the several embodiments of the disclosure. The display screen 200 comprises a serving zone status area 202, a serving zone set point control area 204, an ambient zone status area 206, and a fan control area 208, and an ambient zone set point control area 210.

In the serving zone status area 202, a hot side temperature 212 indicates a current temperature of the serving zone 110. In the example shown, the hot side temperature is 45.53° C. A vent fan icon 214 indicates a current operational status of the vent fan 134. In the example shown, the vent fan 134 is off. In some implementations, the vent fan icon 214 is selectable to toggle the operational state of the vent fan 134 (e.g., turn on or off the vent fan 134). A heater icon 216 indicates a current operational status of the heating elements 132. In the example shown, the heating elements 132 are turned on. In some implementations, the heater icon 216 is selectable to toggle the operational state of the heating elements 132 (e.g., turn on or off the heating elements 132).

In the serving zone set point control area 204, a set point icon 218 indicates a current set point temperature in the serving zone 110. In the example shown, the current set point is 60° C. In response to selection of an up control icon 220 or a down control icon 222, the set point temperature for the serving zone 110 is raised or lowered, respectively.

In the ambient zone status area 206, shelf temperatures 224*a*, 224*b*, 224*c* indicate a measured temperature of each of the product shelves 102 in the ambient zone 142, respectively. In the example shown, product shelf 102*a* has a temperature in the ambient zone 142 of 33.87° C. Product shelf 102*b* has a temperature in the ambient zone 142 of 32.44° C. Product shelf 102*c* has a temperature in the ambient zone 142 of 28.10° C. An ambient temperature icon 226 indicates a temperature measurement of an ambient environment surrounding the beverage warmer 100.

In the fan control area 208, a circulation fan icon 228 indicates a current operational status of the circulation fans 130. In the example shown, the circulation fan icon 228 indicates that the circulation fans 130 are off. In some implementations, the circulation fan icon 228 is selectable to toggle the operational state of the circulation fans 130 (e.g., turn on or off the circulation fans 130). A storage fan icon 230 indicates a current operational status of the ambient vent fans 148. In the example shown, the storage fan icon 230 indicates that the ambient vent fans 148 are off. In some implementations, the storage fan icon 230 is selectable to toggle the operational state of the ambient vent fans 148 (e.g., turn on or off the ambient vent fans 148).

In the ambient zone set point control area 210, an ambient set point icon 232 indicates a current set point temperature in the ambient zone 142. In the example shown, the current ambient set point is 35° C. In response to selection of an up control icon 234 or a down control icon 236, the set point temperature for the ambient zone 110 is raised or lowered, respectively.

The above described display screen 200 is shown upon selection of an enclosure icon 238. Upon selection of a lanes icon 240, a different display screen (not shown) may be displayed with different control settings and measurements associated with each of the product lanes 104. For example, one or more temperature sensors may indicate a current temperature in the heating zone 140 for each of the product lanes 104. One or more icons may indicate a current operational status of one or more heating elements in each of the product lanes 104 and be selectable to change the operational status. One or more icons may indicate a current heating set point temperature for each of the product lanes 104 in the heating zone 140 and control icons can adjust the heating set point temperature. One or more icons may indicate a current status of the heating outlet door 124 and the heating inlet door 154 and can toggle the operational status of each (e.g., rotate or open the doors, respectively). One or more icons may indicate a wait time set point that indicates how long to wait when a product is removed from the serving area 112 before a product is transported from the ambient zone 142 to the heating zone 140 to replace the removed product. The wait time allows for consumers to remove and replace products while deciding which product to select. Control icons can adjust the wait time set point.

Upon selection of a heating times icon 242, a different display screen (not shown) may be displayed with different control settings and measurements associated with each of the product lanes 104. For example, a heating time set point can indicate how long products are maintained in the heating zone 142 before being transported to the serving zone 110. Control icons can adjust the heating time set point. In various implementations, the heating time set point may be individually adjusted within each of the product lanes 104. Accordingly, products in different product lanes may be heated for different times to account for differences in package size and a material of the packaging. Other control settings and measurements may be displayed and manipulated via the user interface 150.

FIGS. 3A-3F illustrate various views of a beverage warmer shelf assembly 300 suitable for implementing the several embodiments of the disclosure. The shelf assembly 300 may be used for each of the product shelves 102 described above, where like number represents like parts. Each of the product lanes 104 of the shelf assembly 300 comprises a door orientation sensor 302 and a door orientation disk 304. The door orientation disk 304 is coupled to and configured to rotate with the heating inlet door 154 and the heating outlet door 124. In some implementations, the door orientation disk 304 comprises one or more magnets positioned on the door orientation disk 304 to correspond with predetermined orientations of the doors 124, 154 (e.g., an open and/or closed orientation). The door orientation sensor 302 may be a hall effect sensor adapted to detect the presence of a magnets on the door orientation disk 304 for determining a current orientation of the doors 124, 154. Other orientation sensors are contemplated by this disclosure. The door orientation sensor 302 senses an orientation of the doors 124, 154 for one or more orientations (e.g., an open orientation, a partially open orientation, a closed orientation, etc.).

Each of the product lanes 104 of the shelf assembly 300 also comprise a lane controller 306 and a motor 308. The lane controller 306 is in communication with the main controller 144 and configured to receive configuration settings provided through the user interface 150. In turn, the lane controller 306 modifies operation of one or more components of the product lanes 104. For example, the lane controller 306 may receive inputs from the proximity sensors 116, 118, 156 in a product lane 104 and control operation of the doors 124, 154 accordingly. The lane controller 306 also controls operation of heating elements in the heating zone 140 as well as controls operation of the motor 308, described in more detail below. The lane controller 306 also provides operating status information of a product lane 104, such as an inventory state of the product lane (e.g., number of products in each of the serving area 112 and the loading area 152), a set point temperature in the heating zone 140, a heating time for products to remain in the heating zone 140, an amount of time remaining before a product located in the heating zone 140 will be transported to the serving area 112, and any other operating status of a product lane. By providing a separate lane controller 306 for each of the product lanes 104, the product lanes 104 may independently operate. In some implementations, one or more of the product lanes may have a different heating or serving temperatures and/or different heating times.

In the example shown, operation of the doors 124, 154 is controlled by the motor 308. Upon activation, the motor 308 rotates a main drive gear 310. An inlet door gear 316 and a transfer gear 312 are in intimate contact with the main drive gear 310 such that rotation of the main drive gear 310 results in rotation of each of the inlet door gear 316 and the transfer gear 312. An outlet door gear 314 is in intimate contact with the transfer gear 312 such that rotation of the transfer gear 312 results in rotation of the outlet door gear 314. The inlet door gear 316 is coupled to and rotates with the heating inlet door 154 and the outlet door gear 314 is coupled to and rotates with the heating outlet door 124. Accordingly, a single motor is configured to control operation of both of the doors 124, 154 in a product lane 104.

While the gear ratios in the example shown result in both of the doors 124, 154 traveling at the same angular distance for each rotation of the motor 308, in some implementations, different gear ratios may be used. For example, a size ratio between the inlet door gear 316 to the outlet door gear 314 may be 1:2. Accordingly, for every rotation of the inlet door gear 316, the outlet door gear travels through two rotations. Such a gear ratio facilitates transporting a product from the heating zone 140 to the serving area 112 without also receiving a product from the loading area 152 into the heating zone 140. In some implementations, a separate motor may be directly coupled to each of the doors 124, 154 to facilitate independent operation of the doors.

By allowing for product to be transported from the heating zone 140 to the serving area 112 without also receiving a product from the loading area 152 into the heating zone 140, the product lanes 104 may follow consumption demand patters. For example, if a product is removed from the serving area 112, and there is still a remaining product in the serving area, and it is determined by the lane controller 306 that the beverage warmer 100 is in a low demand period (e.g., after the lunch rush has ended), a product may not be loaded from the ambient zone 142 to the heating zone 140 despite there being capacity in the serving area 112. In various implementations, a low demand period is one in which a predicted demand for a future demand period is below a low demand threshold (e.g., less than 2 products in the next hour).

A demand pattern may be loaded and stored in a memory of the lane controller 306, such as via the main controller 144. The demand pattern indicates periods of low and high demand for controlling operation of the doors 124, 154. In some implementations, the demand pattern may be dynamically determined based on predictive modeling performed by the lane controller 306 and/or main controller 144 based on past consumption patterns and/or current conditions. For example, the past consumption patterns may be determined by prior sales and product spoilage rates, on a beverage warmer 100 level, product shelf 102 level, or product lane level 104. Such past consumption patterns may also be coupled with a planogram indicating which products are stocked in each of the product lanes 104 of the beverage warmer 100. Current conditions may be based on a current stock level within the beverage warmer 100, weather, holidays, local event schedules, etc. By controlling operation of the doors 124, 154 based on demand patters, fewer products are subject to elevated temperatures, resulting in even lower spoilage rates. Product spoilage is minimized because only a select portion of the inventory is heated (instead of everything). The automatic transport of product within the beverage warmer 100 reduces the labor associated with frequently restocking hot boxes with ambient product. Algorithmically selected products for heating based on demand data increase potential profit by reducing product spoilage and product buy-backs.

Figure 3A:
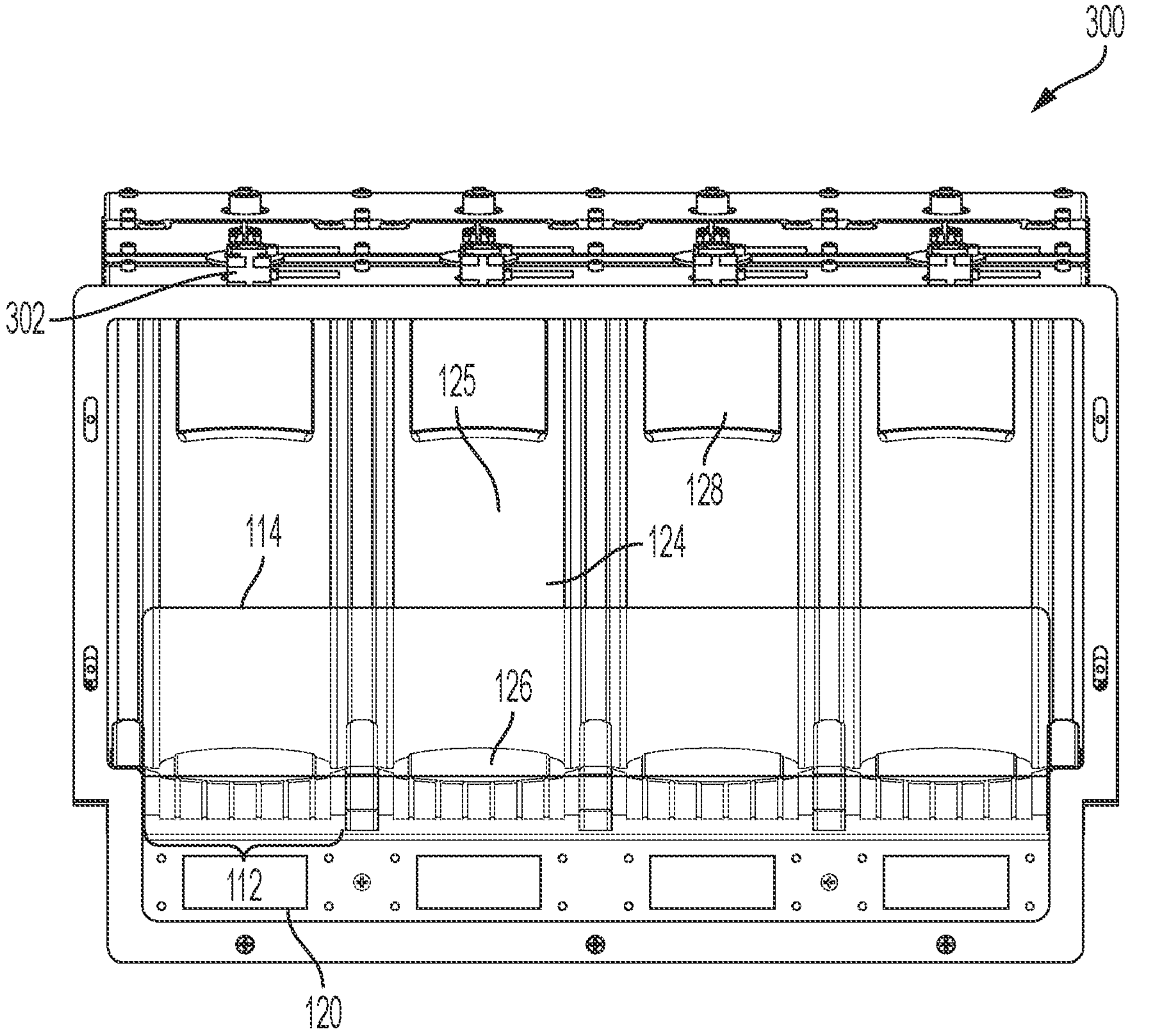
FIGS. 3A-3F illustrate various views of a beverage warmer shelf assembly suitable for implementing the several embodiments of the disclosure.
Figure 3B:
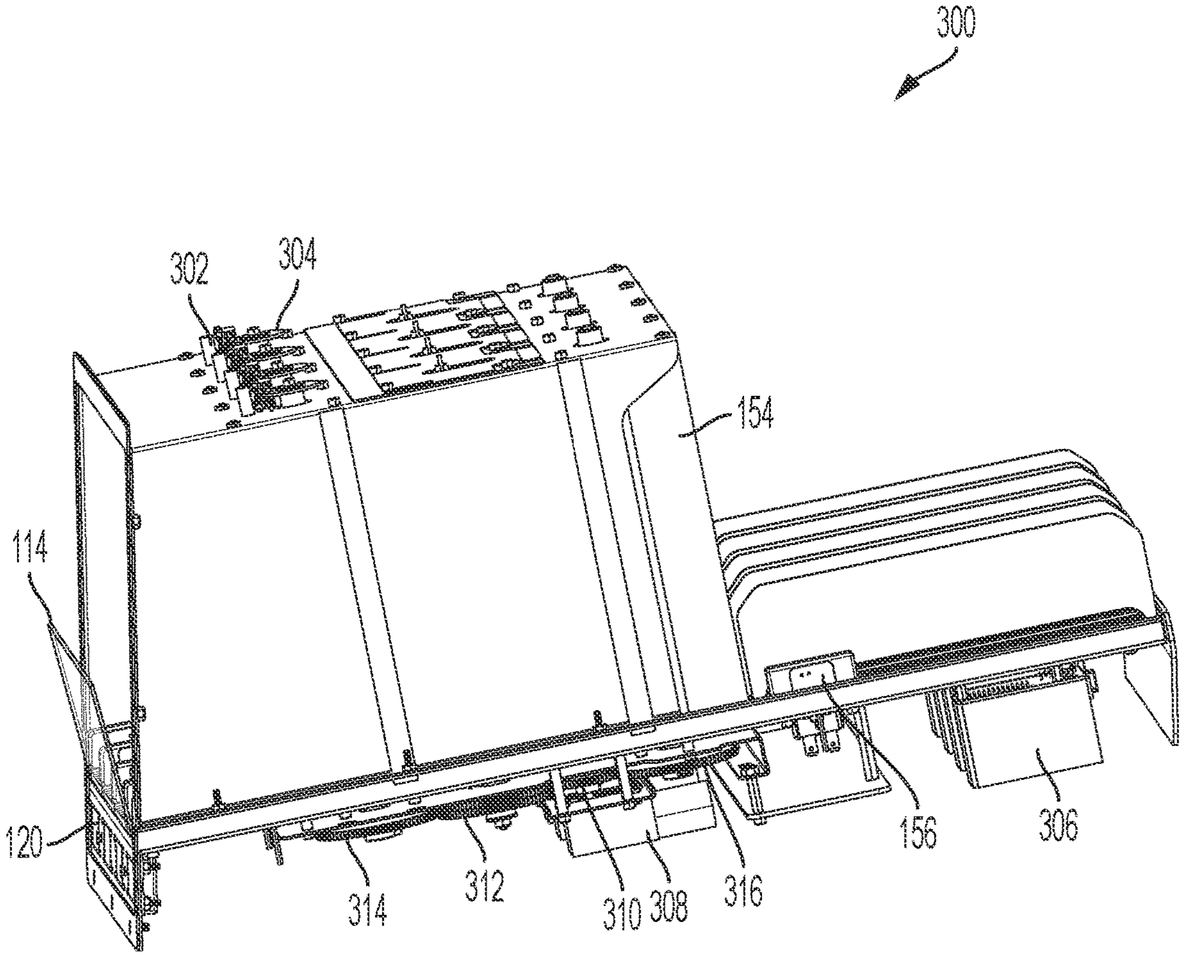
Figure 3C:
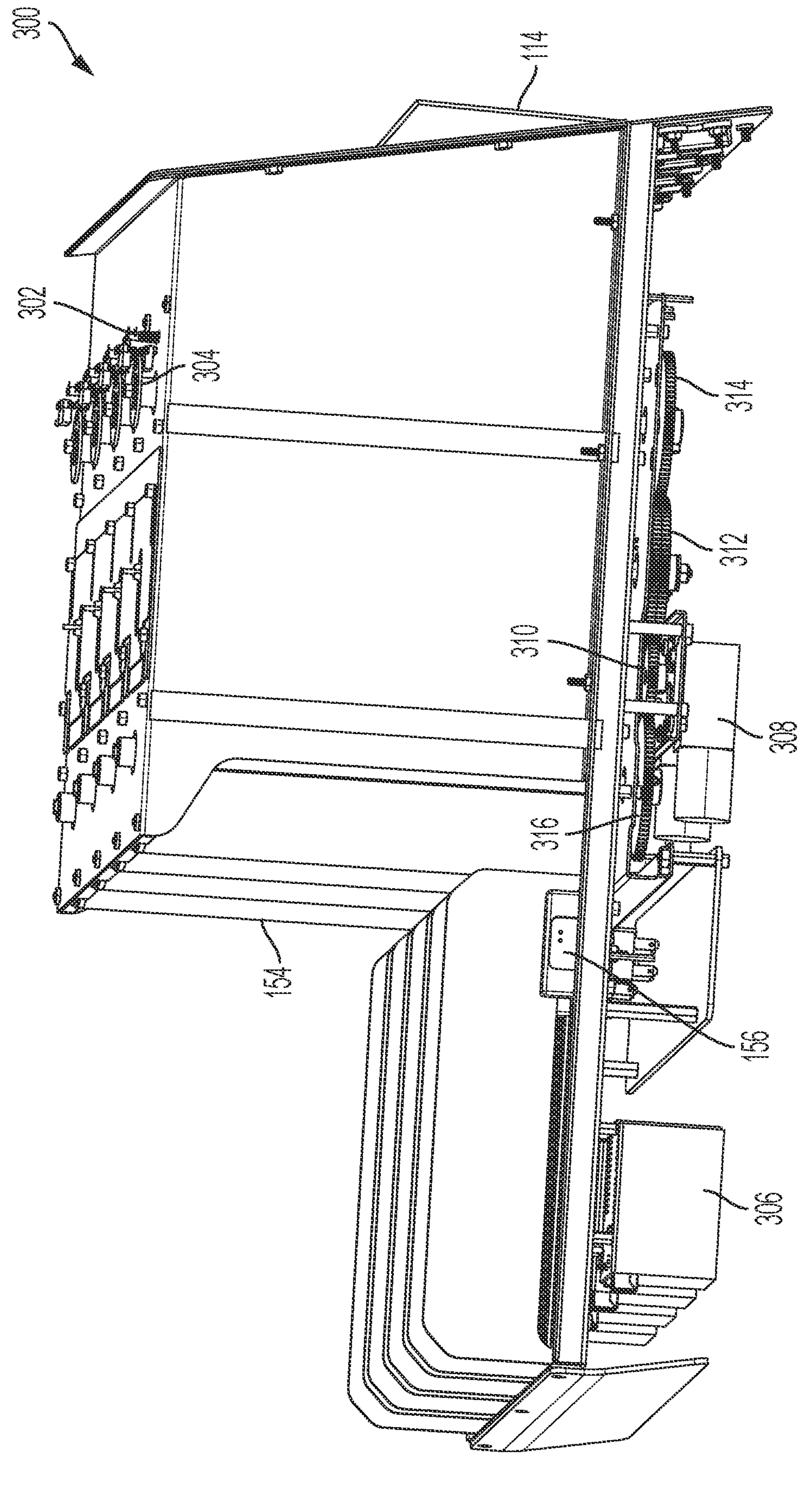
Figure 3D:
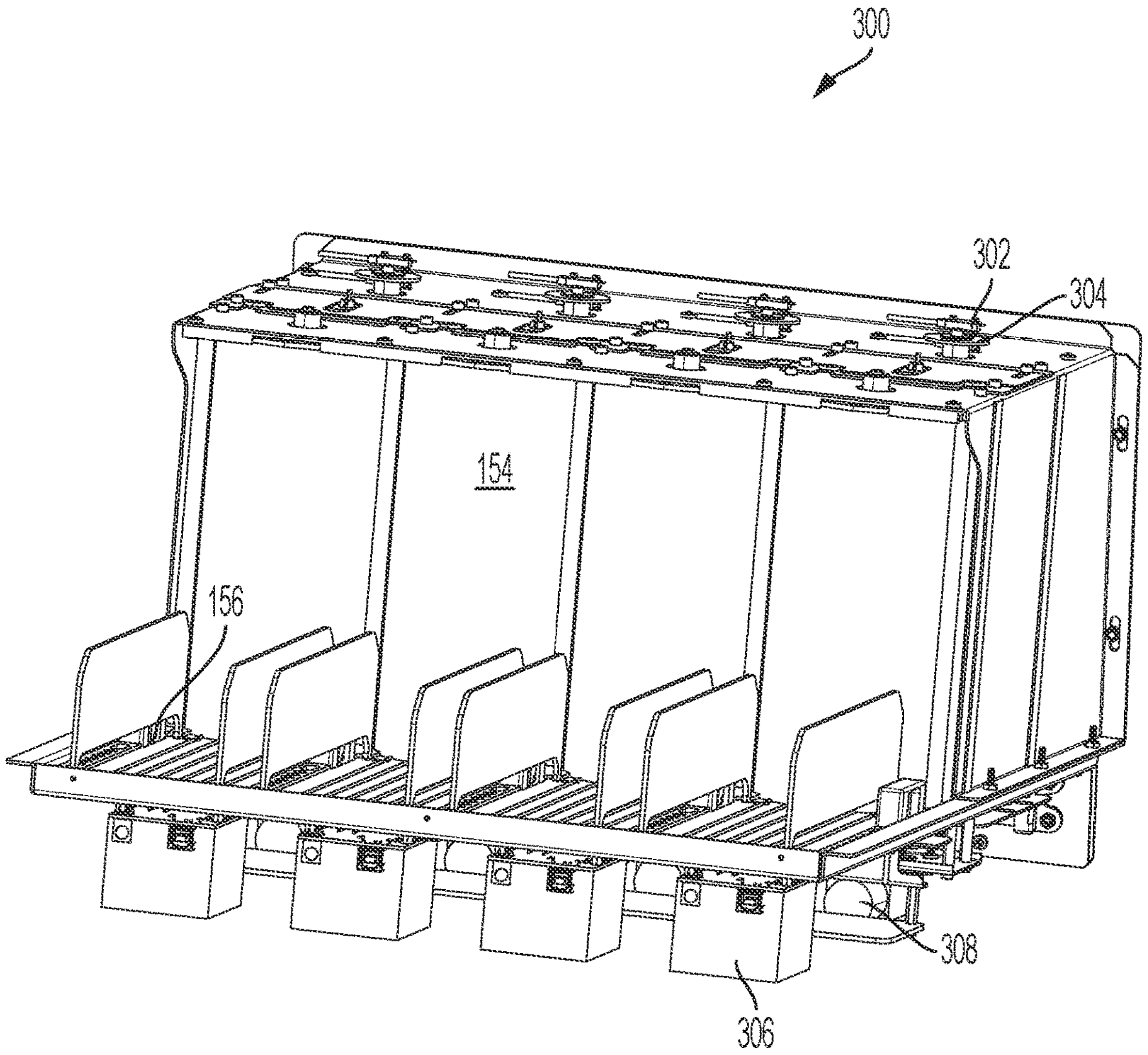
Figure 3E:
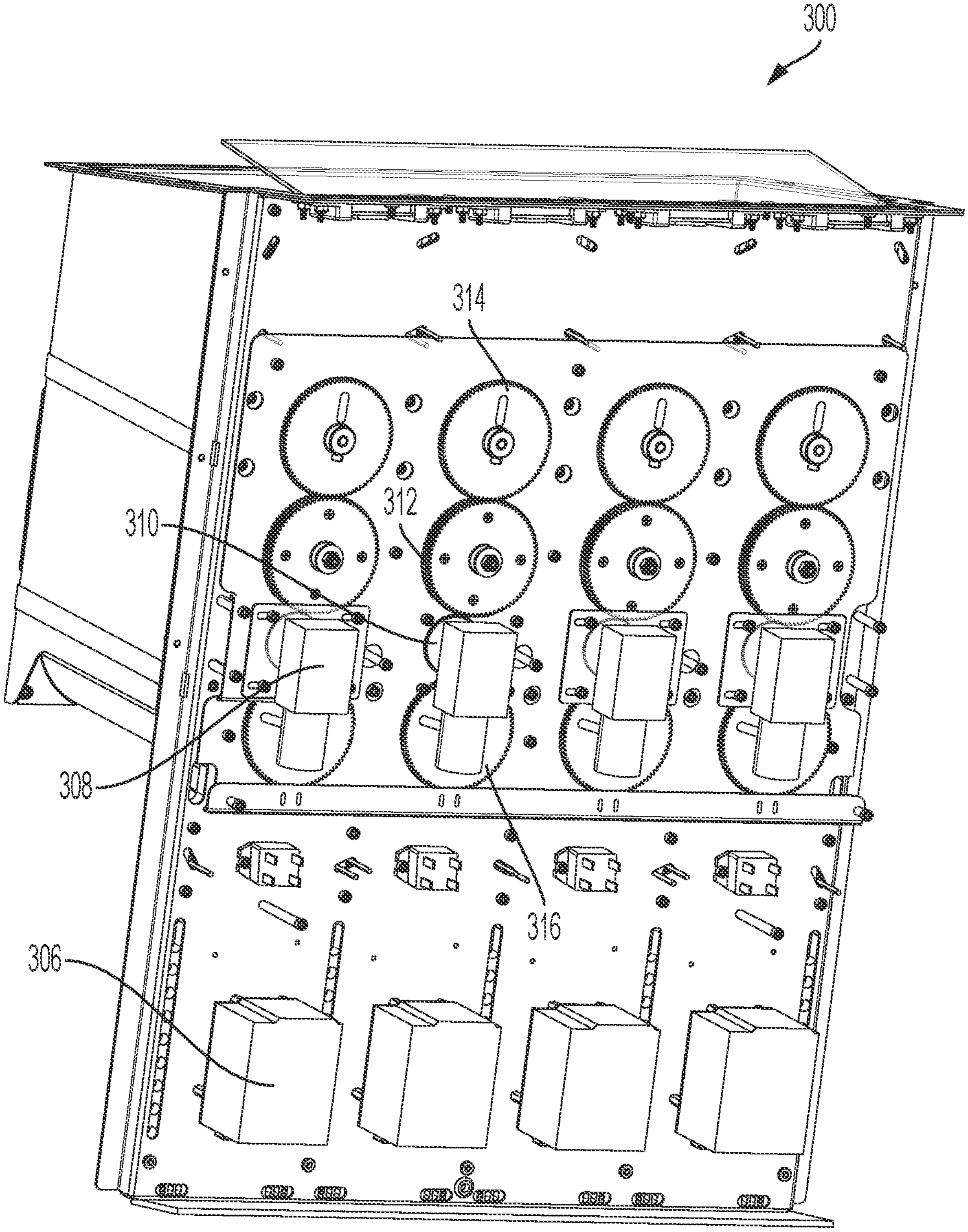
Figure 3F:
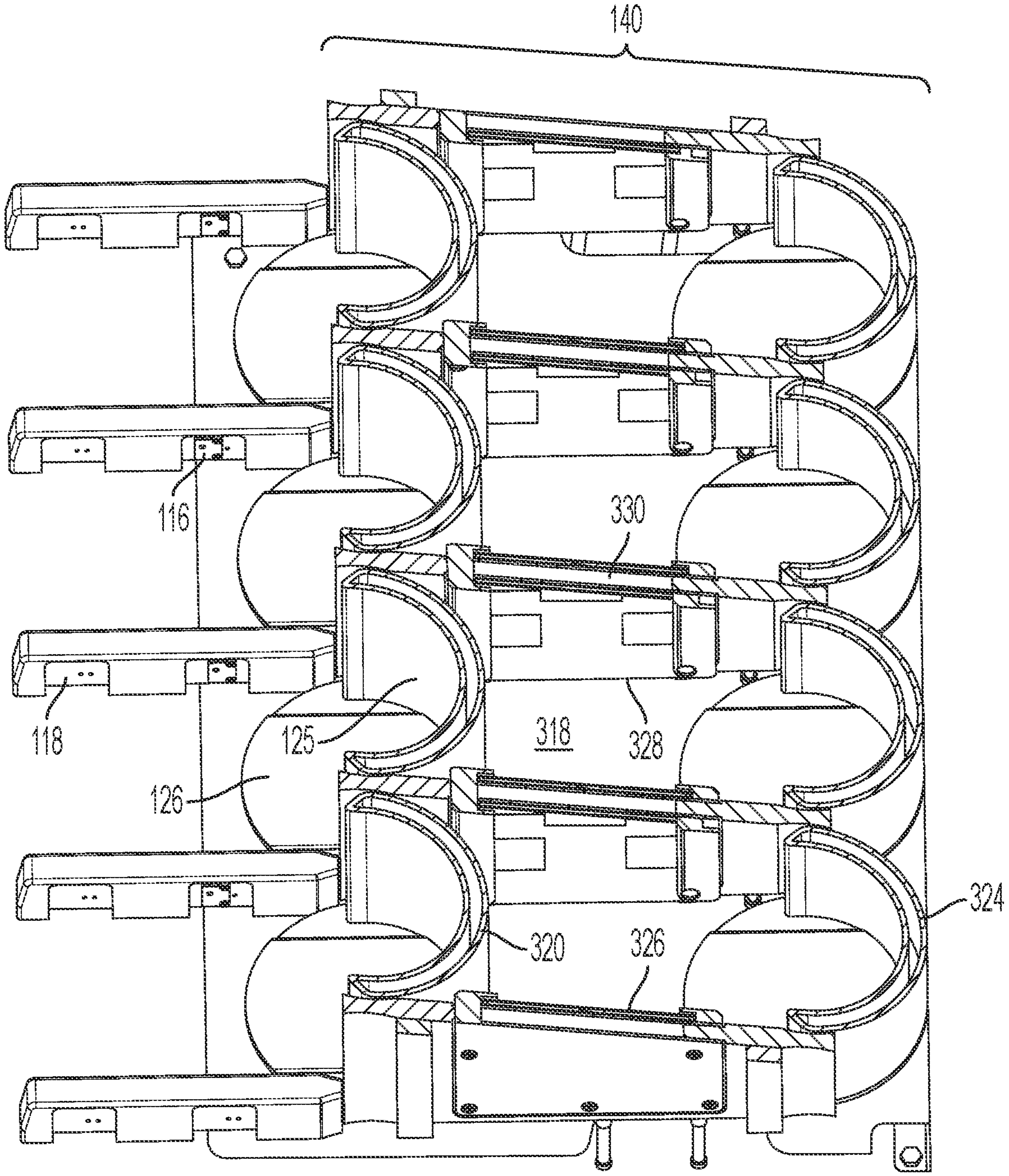

FIG. 3F is a cross-sectional view of the shelf assembly 300 showing details of the heating zone 140. Each of the product lanes 104 in the heating zone 140 comprises a heating area 318 for receiving a product to be heated from the loading area 152. A pair of heating elements 326, 328 are positioned on either size of the heating area 318. Positioning heating elements on two sides of a product facilitates a more even and quicker heating of the product. The heating elements 326, 328 may be a thick-film radiant heating element so as to effectively heat both PET bottles as well as aluminum cans without causing any packaging deformations. Other heating elements, such as silicone, infrared, inductive, thin film resistive, thick film conductive, resistive, forced hot air heaters or convective heating and/or any combination thereof may be used. In implementations where only PET bottles are used, an infrared heater may be particularly effective at heating a product without causing packaging deformations.

In various implementations, the lane controller 306 may control operation of the heating elements 326, 328 to only be activated when a product is present in the heating zone 140. Therefore, the heating elements 326, 328 only consume energy in accordance with the demand loads on the beverage warmer. Accordingly, an amount of energy used to heat and maintain the products at the serving temperature in the beverage warmer 110 are reduced in comparison to beverage warmers that heat all of the products at once.

A heating temperature of the heating elements may be controlled by the lane controller 306. For example, the heating temperature may typically be, for example, 80° C. Other heating temperatures may be used in the heating area 318, such as between 30-100° C. In some implementations, the heating temperature is controlled based on a demand pattern. For example, a product may begin being heated at a reduced temperature (e.g., 5, 10, 15, or 20° C. less than the typical heating temperature) and for a longer time during a low demand period in anticipation of an upcoming high demand period. In some implementations, the product may be heated at a raised temperature (e.g., 5, 10, 15, or 20° C. more than the typical heating temperature) for a short period of time. In some implementations, the product may be heated at different temperatures at different times (e.g., an oscillating or otherwise varying heating temperature) to increase heat transfer while preventing packaging deformation. In some implementations, a product may be maintained in the heating area 318 with the heating elements 326, 328 turned off. For example, a desired temperature of products may change throughout the day (e.g., warm beverages in the morning and reduced temperature or ambient temperature beverages at lunch). More generally, the lane controller 306 can automatically select the most appropriate target temperature for a next package to be heated based on demand. By dynamically being able to heat or cool certain regions of a single counter-top unit's inventory, product quality can be maintained regardless of consumer demand (wanting hotter product available to buy) or ambient temperature (cooling inventory prior to heating to prolong shelf life).

In some implementations, a single heating element may be used in each of the product lanes 104. In some implementations, a heating element may be located on other surfaces, such as on the heating area 318. In some implementations, a product agitator (not shown) may operate to rotate or vibrate the product in the heating area 318 to increase a rate of heat transfer to the product. In some implementations, the heating outlet door 124 is used as a product agitator by oscillating back and forth without fully opening. For example, the heating outlet door 124 may oscillate about 5°-30° of rotation. In some implementations, different types of heating elements may be used in different product lanes 104. For example, one of the product lanes 104 may be designated for use with PET packaged products and an infrared heater(s) may be used in the designated product lane. Other product lanes 104 may have different heating elements that are particularly suited for heating aluminum packaging.

In order to limit excess heat from the heating zone 140 from entering the serving zone 110 the wall 125 of the heating outlet door 112 is formed with an insulating air gap 320. Likewise, to limit excess heat from the heating zone 140 from entering the ambient zone 142 the wall 155 of the heating inlet door 152 is formed with an insulating air gap 324. In some implementations, insulation material, such as a polyurethane foam, may fill the gap 320 and/or the gap 324. Additionally, between each of the product lanes 104 and on the ends of the product lanes 104, the heating zone 140 comprises an air gap 330. In some implementations the gap 330 may be filled with insulation material, such as a polyurethane foam or a vacuum panel. Providing insulation between each of the product lanes 104 facilitates different heating and serving temperatures among the different product lanes.

In various implementations, a demand pattern for the beverage warmer 100 is determined by a machine learning model. The machine learning model makes forward demand predictions for a period of time (e.g., hour, day, week, next restock event, etc.) based on past demand and current condition inputs to the machine learning algorithm. The past demand and current condition inputs that are used to train the machine learning model include a date and/or time for a demand period (e.g., a given time period on a given day of the week in a given month), a number of products purchased in the demand period (e.g., number purchased/removed from each of the product lanes 104 as well as a type of product purchased/removed), an amount of customer demand in the demand period (e.g., number of consumers in an outlet during the demand period), a stock level (e.g., how many products of each product type are maintained in the beverage warmer 100), a spoilage behavior (e.g., how many products are removed from the beverage warmer 100 due to spoilage or perceived spoilage), a stock heat level (e.g., a number of products currently heated or being heated in the beverage warmer 100), outlet hours (e.g., normal business hours for a retail outlet with the beverage warmer 100), weather and seasonality (e.g., a current local weather forecast for the demand period and information about which season it is, including any local holidays or special events), location (e.g., outlet identification, map location, geographic coordinates, geographic description), and customer profiles (e.g., customer identification, customer preferences). Other training inputs may be provided to the machine learning model.

In some implementations, the machine learning model may be trained and executed on the beverage warmer 100 (e.g., on the main controller 144 or each of the lane controllers 306). In some implementations, the machine learning model is trained remotely, such as on a server (not shown) that receives operational inputs of the operation of the beverage warmer 100 (e.g., number of products stocked, number sold, number of buy-backs, etc.). The server may periodically re-train the model based on updated operation inputs from the beverage warmer 100 and supply an updated demand prediction model to the beverage warmer 100 for execution on the main controller 144 or each of the lane controllers 306. In some implementations, the machine learning model may be trained and executed on the server to generate demand predictions. The generated demand predictions may be loaded on the beverage warmer 100, such as in the form of a demand profile, and the beverage warmer 100 may operate based on the received demand predictions.

In various implementations, the machine learning model is trained to predict demand patterns to minimize costs associated with product spoilage and missed sales. In some implementations, other success criteria may be modeled with the machine learning algorithm, such as maximizing revenue, missing no consumers, minimizing energy consumption, maximizing offering choice. Costs associated with product spoilage such as a cost of lost product (e.g., per-product cost in a product buy-back plan), cost of taking up space in the beverage warmer 100 that could otherwise be used for usable stock, and/or incremental costs associated with a mechanism for removing products after a predetermined product spoilage time. Costs associated with missed sales include lost revenue or lost profits. For beverage products, typically costs associated with a missed sale are greater than costs associated with product spoilage.

Only minimizing for costs associated with product spoilage may lead to a very conservative demand model (e.g., only heat products when there is consumer demand such as upon receiving an input on the beverage warmer 100 leading to long wait times and lost sales). Only minimizing costs associated with missed sales may lead to very liberal demand model (e.g., heat all products as is currently performed leading to increased product spoilage). Therefore, the machine learning algorithm of the pending disclosure seeks to minimize a cost ratio (CR) of the costs of missed customers to the cost of product spoilage, shown below:

$$CR = \left(\frac{\$\text{ cost of missed customers}}{\$\text{ cost of discarded product}}\right). \qquad \text{Equation (1)}$$

In an example, the machine learning model is a random forest regression, though other machine learning models may be used, such as a gradient boosting machine or other ensemble method. Alternatively, deep learning methods may be used. The random forest regression generates a demand prediction for a future demand period using a cost function that minimizes the cost ratio. For example, the demand prediction may be for a next hour of demand, a next period of time until a restock is scheduled for the beverage warmer 100, or some other demand period. In an example, the demand period is for a given hour of a given day of the week (e.g., 1 pm on Monday).

Demand data for the demand period is obtained from a historical demand data set and a standard deviation of the historical demand is determined (e.g., the standard deviation from demand levels for Monday's at 1 pm in the historical demand data set). A demand buffer is determined based on a product of the standard deviation of the historical demand for the demand period with the cost ratio. In some implementations, more complex demand buffer may be determined that accounts for additional parameters that impact demand, such as local weather, holidays, events, or other such dynamic demand events. The demand buffer models the natural variation in demand over time while accounting for the cost of the demand variation. A baseline demand prediction is determined based on the historical demand data for the demand period (e.g., an average of the demand for the demand period). Other baseline demand predictions may be used. Based on the above, a cost function for split decisions in the random forest regression is:

$$\text{Regression: } P+(CR*\sigma_D), \qquad \text{Equation (2)}$$

where CR is the cost ratio, $\sigma_D$ is the standard deviation of the historical demand for the demand period, and P is the baseline demand prediction based on historical demand data for the demand period.

While for beverage products costs associated with a missed sale are typically greater than costs associated with product spoilage, for some products the costs associated with product spoilage may be greater than the costs associated with a missed sale. In such situations, the cost function for split decisions in the random forest regression is modified to:

$$\text{Regression: } P-(CR*\sigma_D). \qquad \text{Equation (3)}$$

Other variations of a cost function based on the cost ratio are contemplated by this disclosure.

Figure 4A:
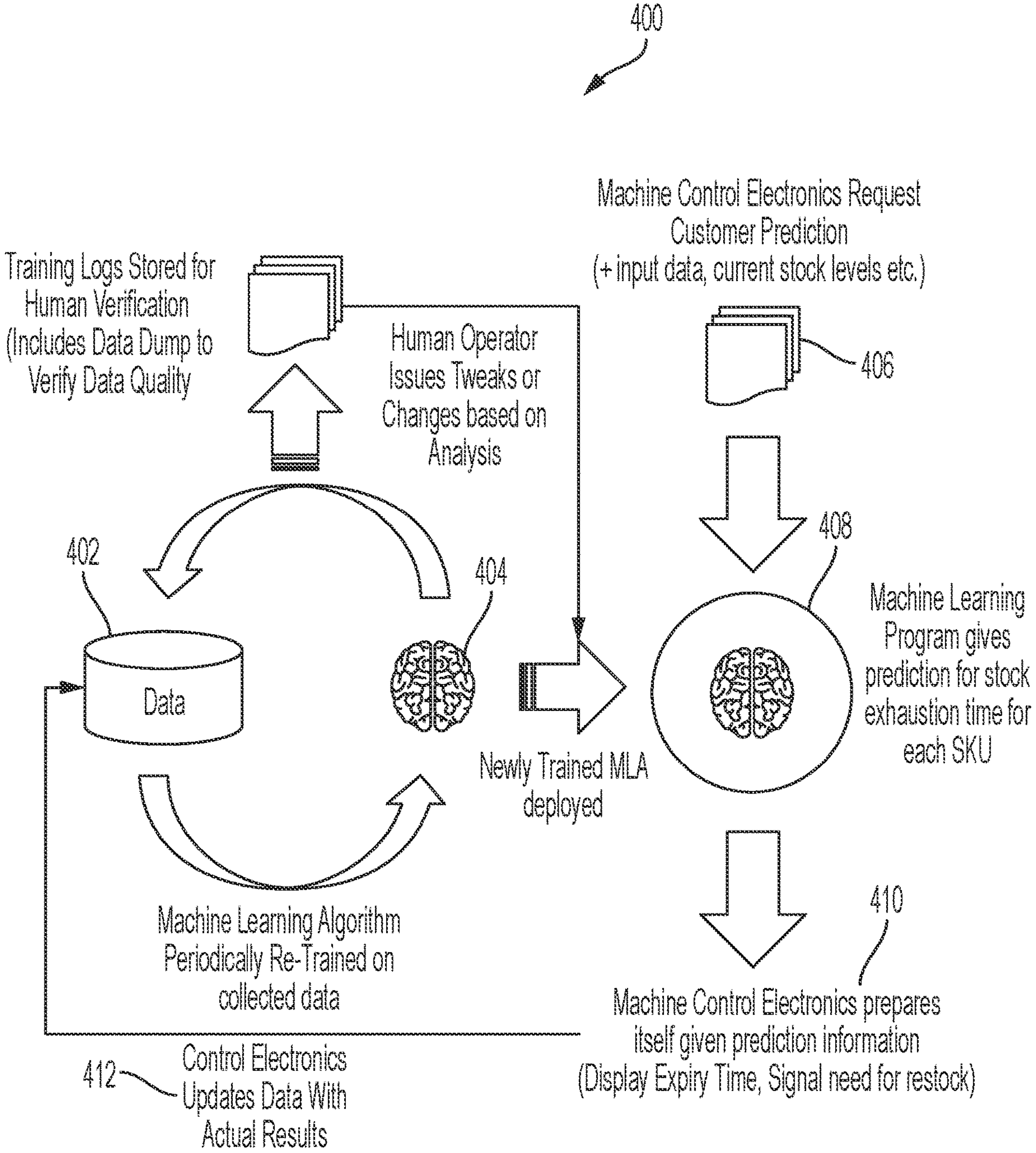
FIG. 4A is a flow chart of a machine learning process suitable for implementing the several embodiments of the disclosure.

FIG. 4A is a flow chart of a machine learning process 400 suitable for implementing the several embodiments of the disclosure. A database 402 stores a set of historical demand data for various demand periods, such as the past demand inputs described above. For example, the historical demand data may include a number of products purchased in prior demand periods, an amount of customer demand in prior demand periods, a spoilage behavior in a prior demand period, etc. Using the data in the database 402, a machine learning model is generated at 404. For example, a server in communication with the beverage warmer 100 generates a random forest regression, as described above. Alternatively, one or more of the main controller 144 and/or the lane controller(s) 306 may generate the machine learning model.

The generated machine learning model is then applied to the beverage warmer 100 to made demand predictions. Current condition data 406 is supplied to the generated machine learning model, such as the current condition inputs described above. For example, the current condition data may include a date and/or time for a current demand period, a stock level, a stock heat level, outlet hours, weather and seasonality, and customer profiles. Using the current condition data 406, the machine learning model generates a demand prediction for a future demand period at 408. The demand prediction may be supplied to the beverage warmer 100 for controlling operations thereof. For example, one or more of the doors 124, 154 and/or the heating elements 326, 328 may be operated in accordance with the predicted demand pattern, as described above. Based on the operation of the beverage warmer 100 and actual purchase information, additional data 412 is supplied for updating the database 402.

Figure 4B:
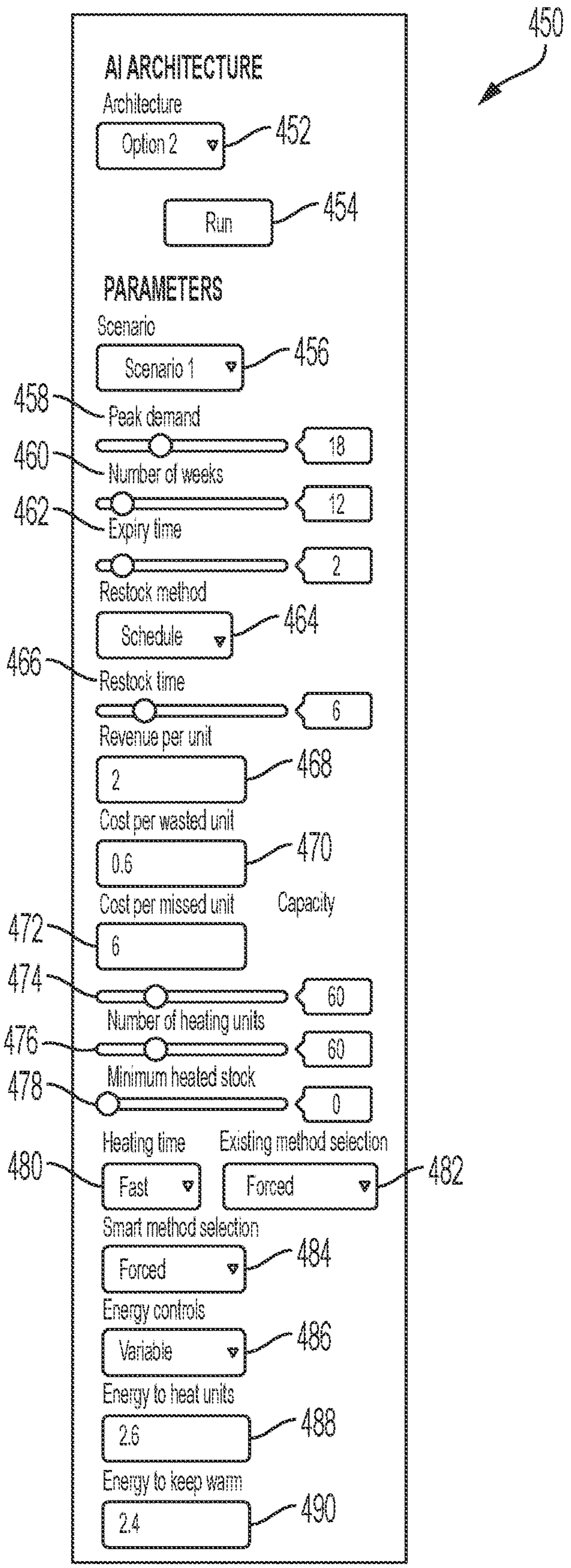
FIG. 4B is a user interface for a dashboard for generating synthetic data for training a machine learning model suitable for implementing the several embodiments of the disclosure.

FIG. 4B is a user interface for a dashboard 450 for generating synthetic data for training a machine learning model suitable for implementing the several embodiments of the disclosure. In various implementations, it is desirable to train the machine learning model using real-world data as opposed to generated synthetic data. In such a situation, the dashboard 450 may be used to isolate desired real-world data for training a machine learning model based on the control electronics of a particular beverage warmer. In some implementations, the machine learning model trained using the generated synthetic data may be used for comparative analysis among control schemes and beverage warmer hardware configurations. In some implementations, the machine learning model trained using the generated synthetic data may be used as an initial model for deployment on a beverage warmer, where real-world data collected from the beverage warmer may be used to generate an updated model for the beverage warmer.

The dashboard 450 may be used to set parameters regarding the behavior of a beverage warmer based on its hardware configuration. While the dashboard 450 may be used to generate synthetic data or filter real-world data for training a machine learning model for the beverage warmer 100 described above, one or more of the parameters in the dashboard 450 may be changed to generate synthetic data or filter real-world data for training a machine learning model for other equipment as well.

As shown, the beverage warmer parameters include an architecture setting 452. The architecture parameter 452 is a drop down menu of selectable architectures for beverage warmers (e.g., an open cabinet architecture where all products are heated at the same time, as currently done; a divided cabinet architecture with separate ambient and heating zones, such as the beverage warmer 100 described above; or a vending architecture, where control components of the beverage warmer pick a desired product to dispense based on a received selection). A run icon 454 cases synthetic data to be generated or real-world data to be filtered based on the configured parameters described herein.

A scenario parameter 456 is a drop down menu of pre-configured beverage warmer operating scenarios (e.g., a convenience store, a gas station, a train station, etc.). Other parameters include a peak demand parameter 458 (e.g., a peak amount of demand that is used to scale a generated demand profile), a time length parameter 460 (e.g., a number of weeks of synthetic demand data to be generated or real-world data to be filtered), and an expiry time 462 (e.g., an amount of time that a product may remain at an elevated temperature prior to expiration). A restock method parameter 464 is a drop down menu of different restocking methods (e.g., restocking on a predetermined schedule, upon depletion of a predetermined fraction of a stock of a beverage warmer, or some other restocking method).

Other parameters include a restock time 466 (e.g., an amount of time between different stocking operations) and a revenue per unit 468 (e.g., amount of revenue generated upon the sale of a product) which in some implementations is used as a key performance indicator (KPI) for the dashboard 450 and not used in training the machine learning model. A cost of a discarded unit 470 and a cost of a missed customer 472 are used in training a machine learning model (e.g., in generating the cost ratio that is used in the cost function described above). A capacity parameter 474 (e.g., how much stock capacity a beverage warmer has), a number of heating units parameter 476 (e.g., a quantity of the total stock that can be heated at a time by a beverage warmer), a minimum heated stock parameter 478 (e.g., a minimum quantity of stock that the beverage warmer must maintain).

A heating time parameter 480, which is a drop down menu of different relative heating rates (e.g., slow, fast) for a beverage warmer, and an existing selection method parameter 482, which is a drop down menu of different selection methods (e.g., random selection, select a freshest product, forced selection of a product by the beverage warmer, etc.). In various implementations, the selection method parameter 482 may be used in comparative analysis among control schemes and beverage warmer hardware configurations, but not used in generating a machine learning model. However, a machine learning selection method parameter 484 is a drop down menu of different selection methods of the beverage warmer to be modeled by the machine learning model (e.g., random selection, select a freshest product, forced selection of a product by the beverage warmer, etc.).

An energy control parameter 486 indicates how much of a beverage warmer's heating capacity can be turned on/off (e.g., a variable amount of heating capacity, all heating capacity, etc.). In various implementations the energy control parameter 486 is used as a KPI for the dashboard 450 and not used in training the machine learning model. An energy to heat a unit parameter 488 (e.g., how much energy the heating zone 140 in the beverage warmer 100 uses to heat a product) and an energy to keep a unit warm parameter 490 (e.g., how much energy the serving zone 110 in the beverage warmer 100 uses to maintain products in the serving zone 110 at the serving temperature—energy usage by the circulation fans 130 and the heating elements 132). In various implementations the energy to heat a unit parameter 488 and the energy to keep a unit warm parameter 490 are used as KPIs for the dashboard 450 and not used in training the machine learning model. More or fewer parameters are contemplated by this disclosure. For example, parameters relating to weather patterns, local events, etc. may also be included in the dashboard 450.

Figure 5:
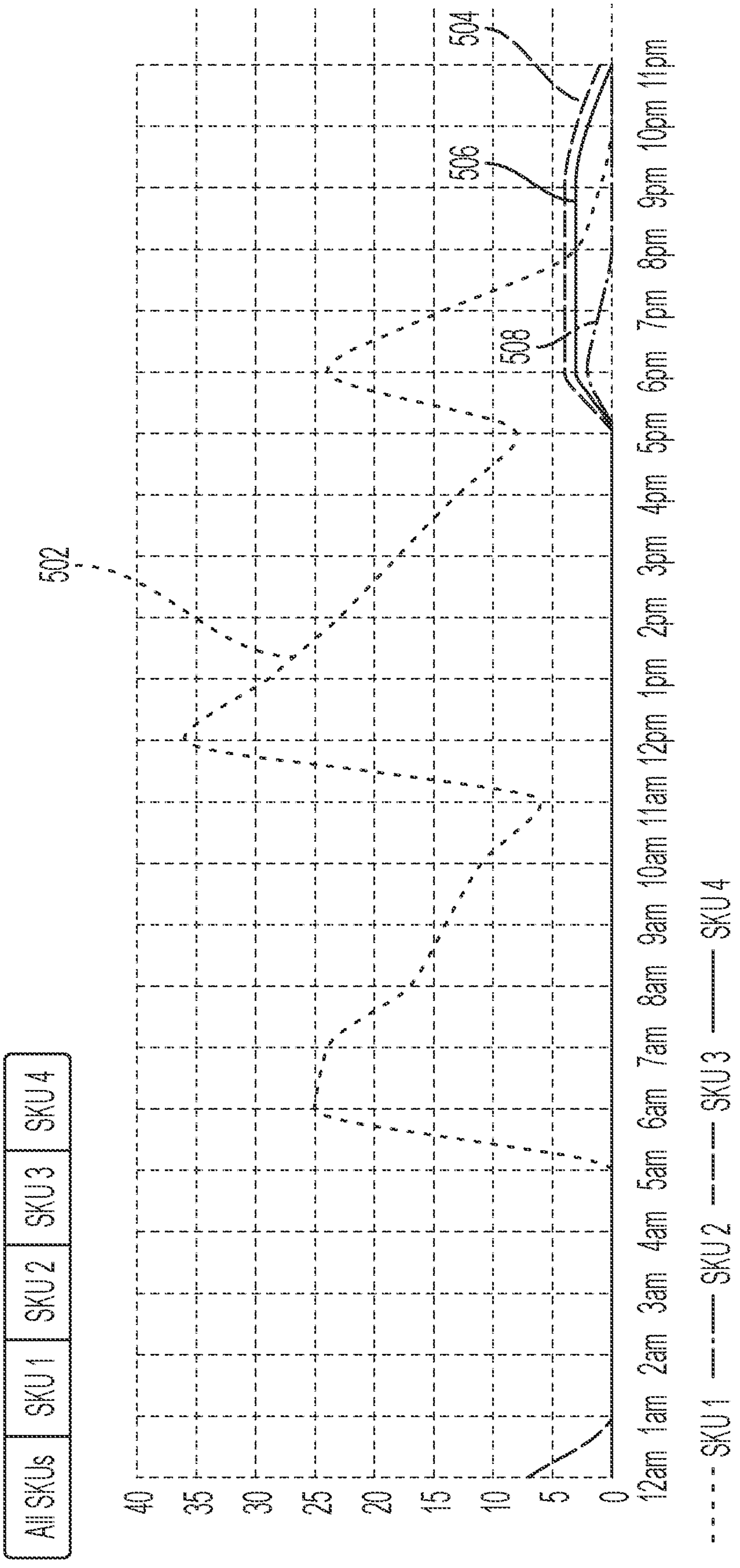
FIG. 5 is a predicted demand pattern for a plurality of different products suitable for implementing the several embodiments of the disclosure.

FIG. 5 is a predicted demand pattern 500 for a plurality of different products suitable for implementing the several embodiments of the disclosure. The predicted demand pattern is shown as a demand amount (e.g., number of products expected to be sold) for each of a plurality of time intervals (e.g., hours) for a prediction period (e.g., a day). A first demand pattern 502 shows a predicted demand pattern for a first product. A second demand pattern 504 shows a predicted demand pattern for a second product. A third demand pattern 506 shows a predicted demand pattern for a third product. A fourth demand pattern 508 shows a predicted demand pattern for a fourth product. In the example shown, the demand for the first product is the only predicted demand between 5 am and 5 pm, when a shift in demand occurs and additional demand is predicted for the other products. Accordingly, not only can operation of the beverage warmer 100 be modified based on the predicted demand pattern (e.g., don't start heating any of the second, third, or fourth products until 5 pm), but machine stock decisions may be made using the predicted demand pattern (e.g., stock a majority or all of the machine with the first product between 5 am and 5 pm).

Figure 6A:
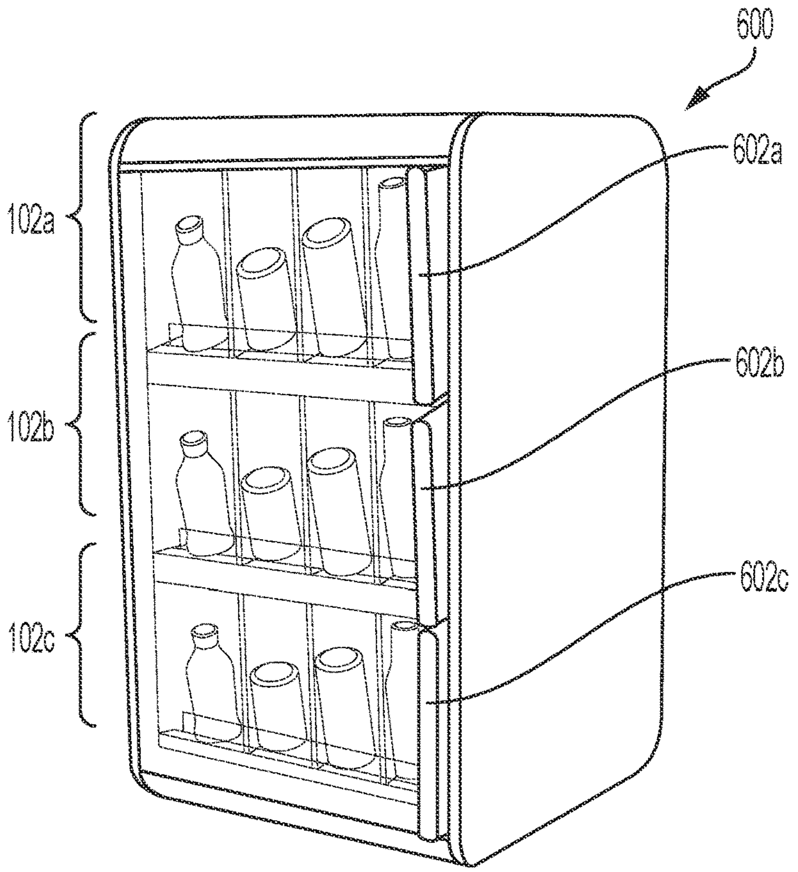
FIGS. 6A-6B illustrate another beverage warmer according to various embodiments of the disclosure.
Figure 6B:
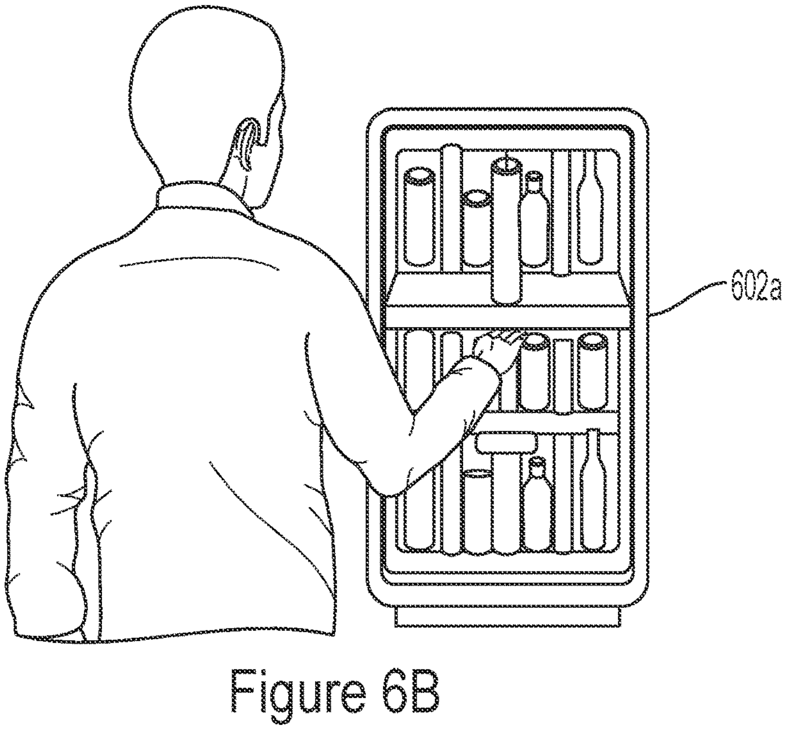

FIGS. 6A-4B illustrate another beverage warmer 600 according to various embodiments of the disclosure. The beverage warmer 600 is substantially similar to the beverage warmer 100 except each of the product shelves 102 has a separate door. For example, a first door 602*a* provides access to the first product shelf 102*a*, a second door 602*b* provides access to the second product shelf 102*b*, and a third door 602*c* provides access to the third product shelf 102*c*. Each of the doors 602 may open downwards, like an oven, as shown in FIG. 6B. In some implementations, the doors 602 may open outwards. Providing separate doors 602 for each of the product shelves 102 facilitates setting different serving temperatures in the serving zone 110. In some implementations, one or more insulating barriers may be positioned between the product shelves 102.

Figure 8:
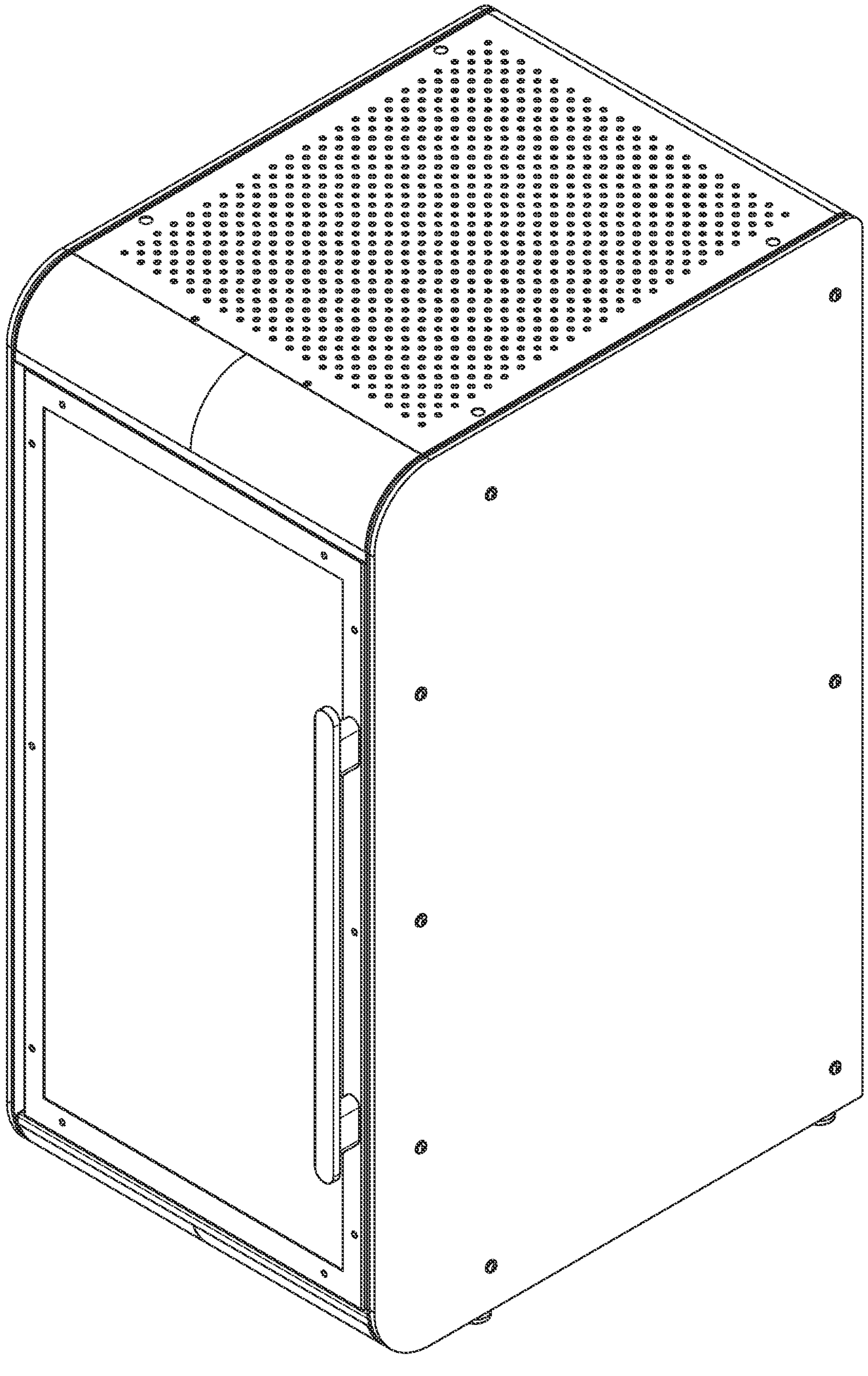
FIG. 8 is a perspective view showing a first embodiment of a new beverage warmer design.
Figure 9:
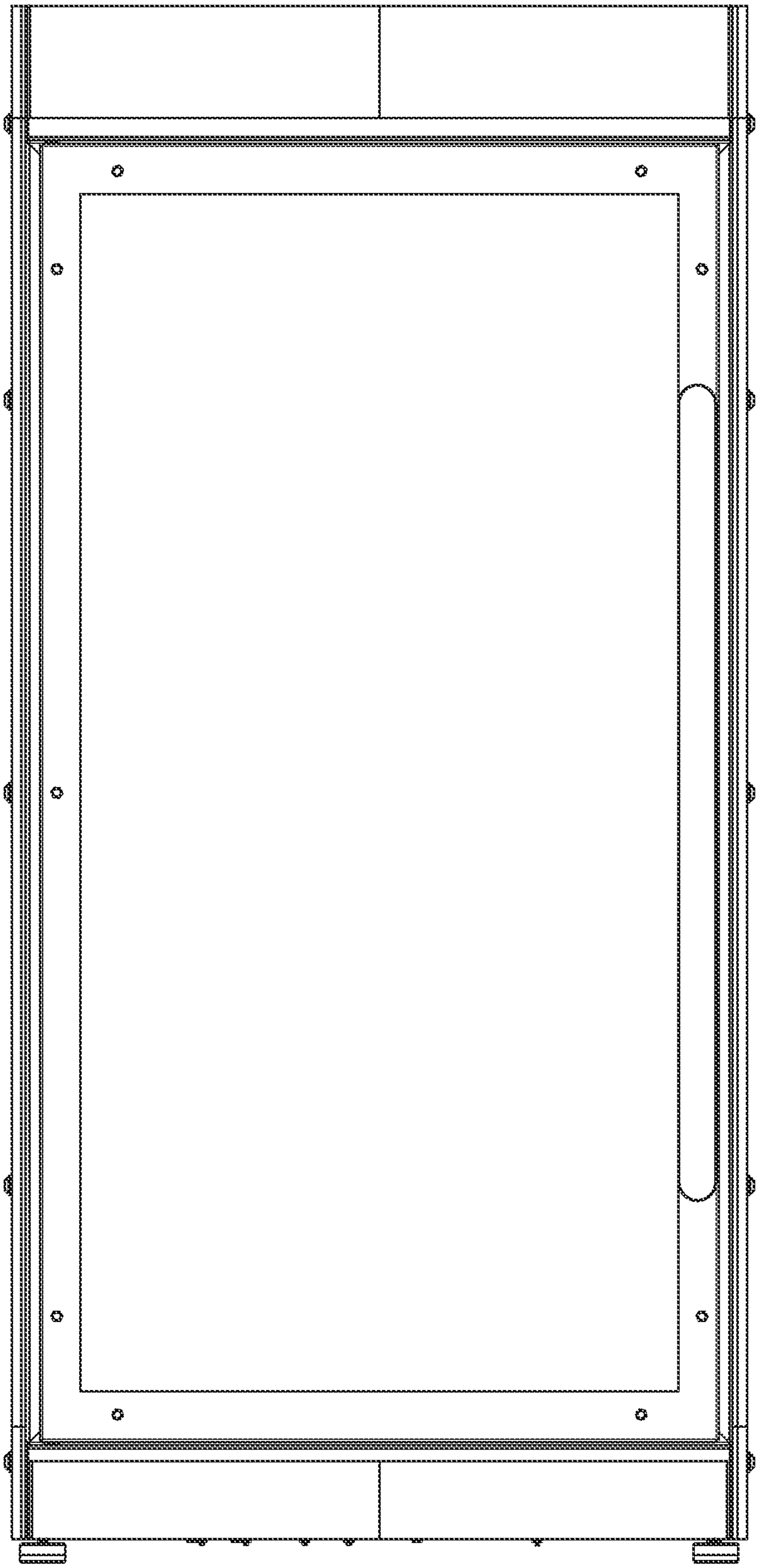
FIG. 9 is a front elevational view of the beverage warmer design.
Figure 10:
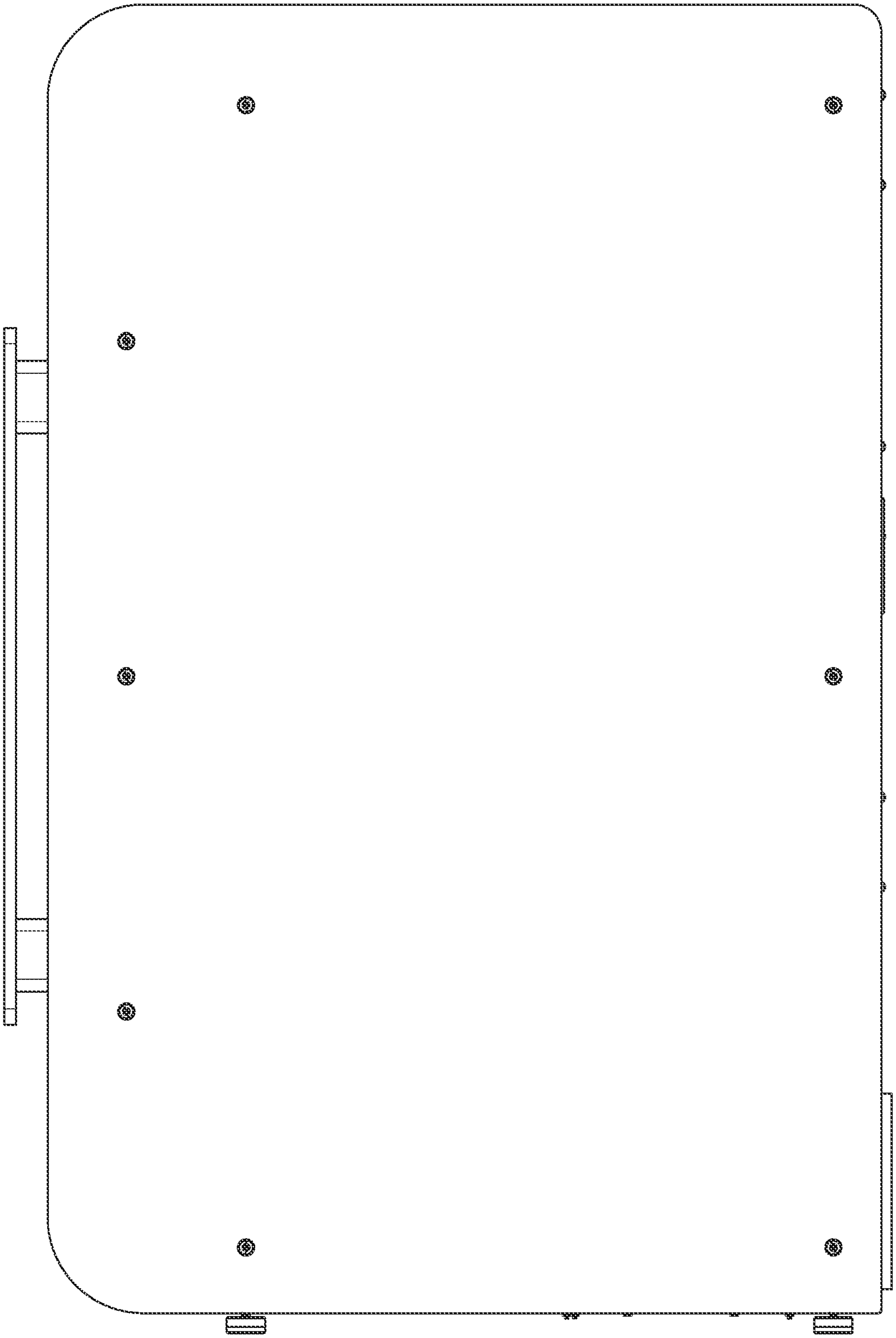
FIG. 10 is a first side elevation view of the beverage warmer design.
Figure 11:
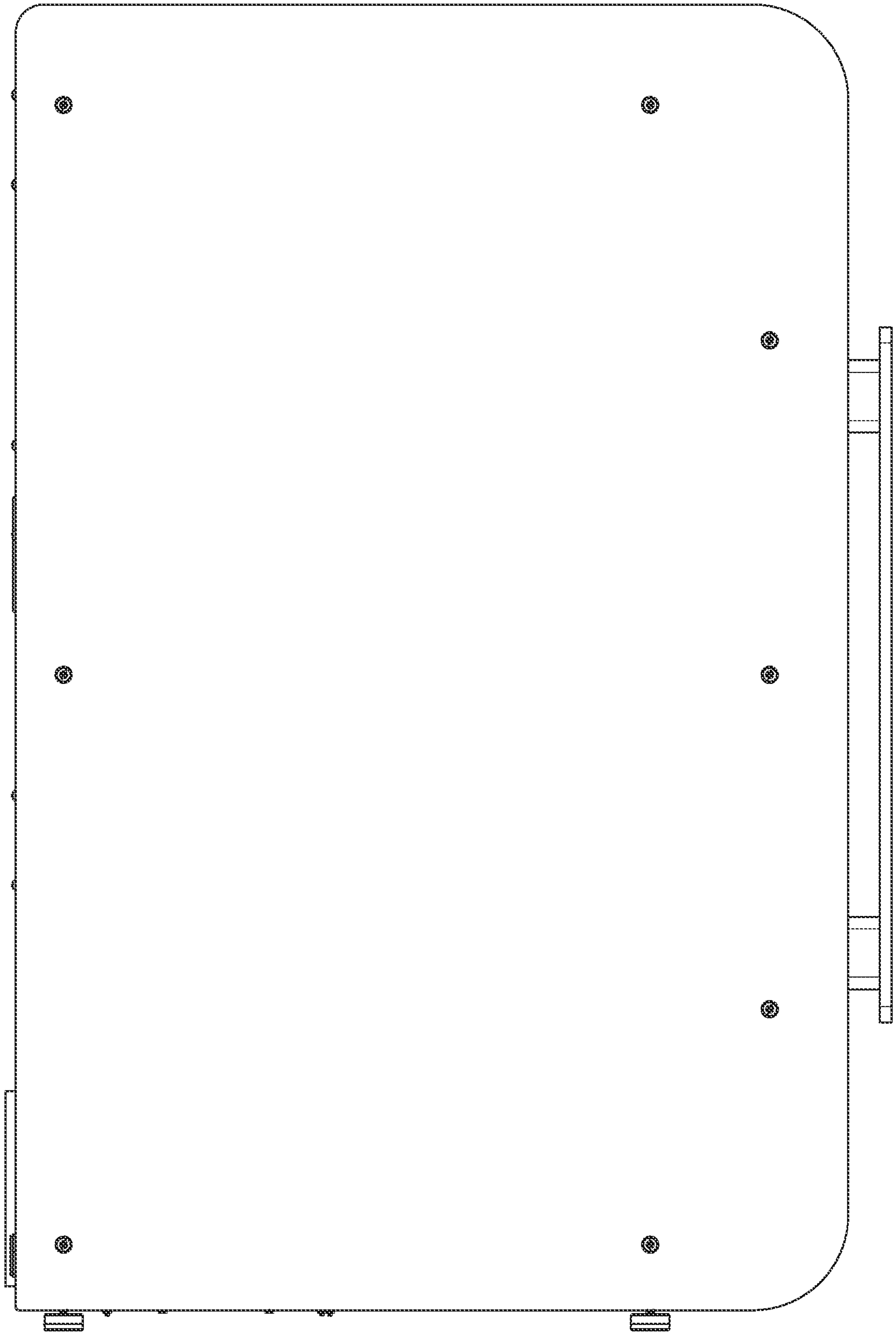
FIG. 11 is a second side elevation view of the beverage warmer design.
Figure 12:
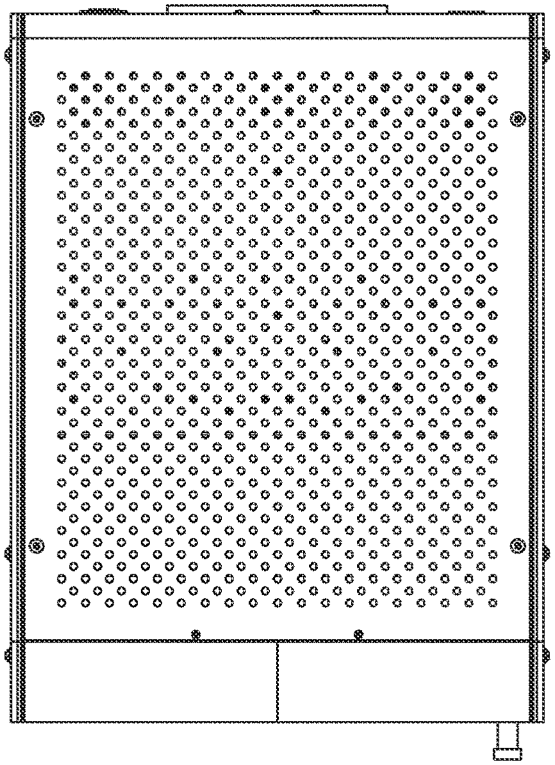
FIG. 12 is a top view of the beverage warmer design.
Figure 13:
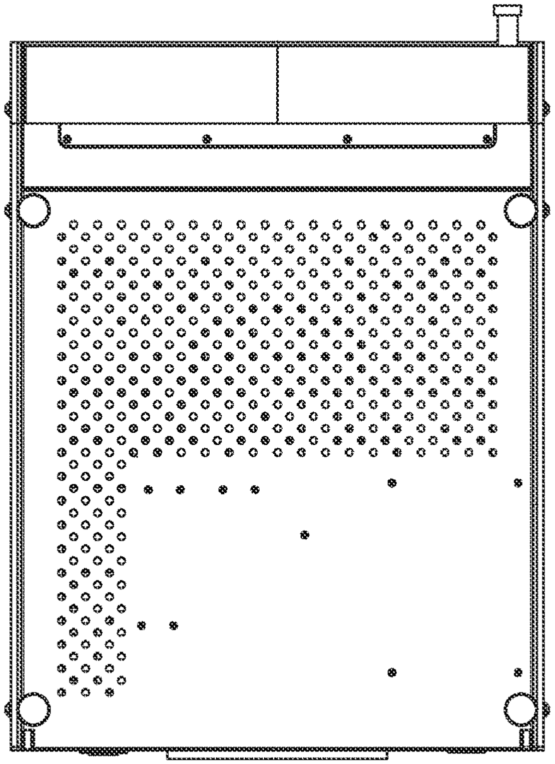
FIG. 13 is a bottom view of the beverage warmer design.
Figure 14:
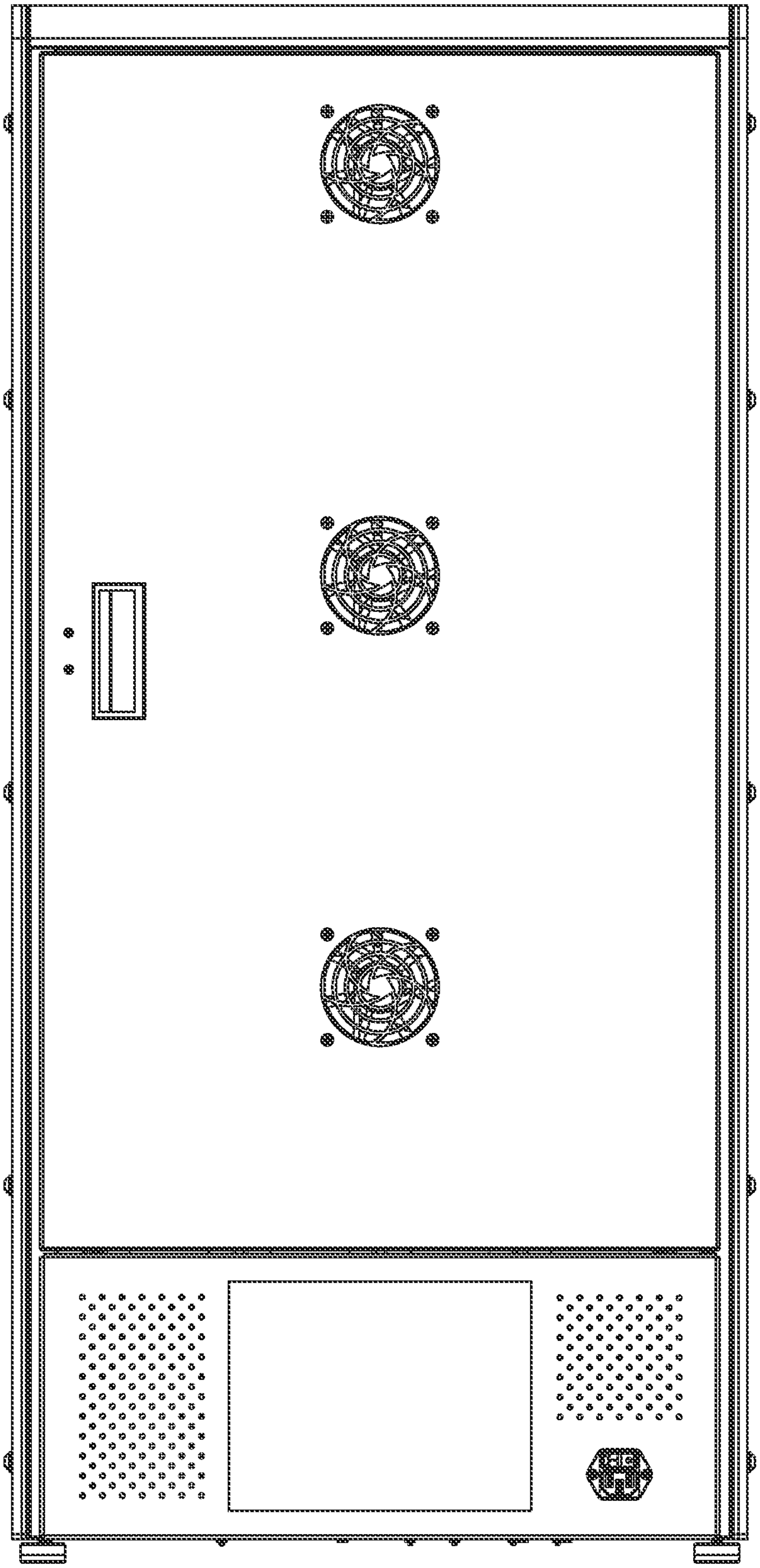
FIG. 14 is a back elevation view of the beverage warmer design.
Figure 15:
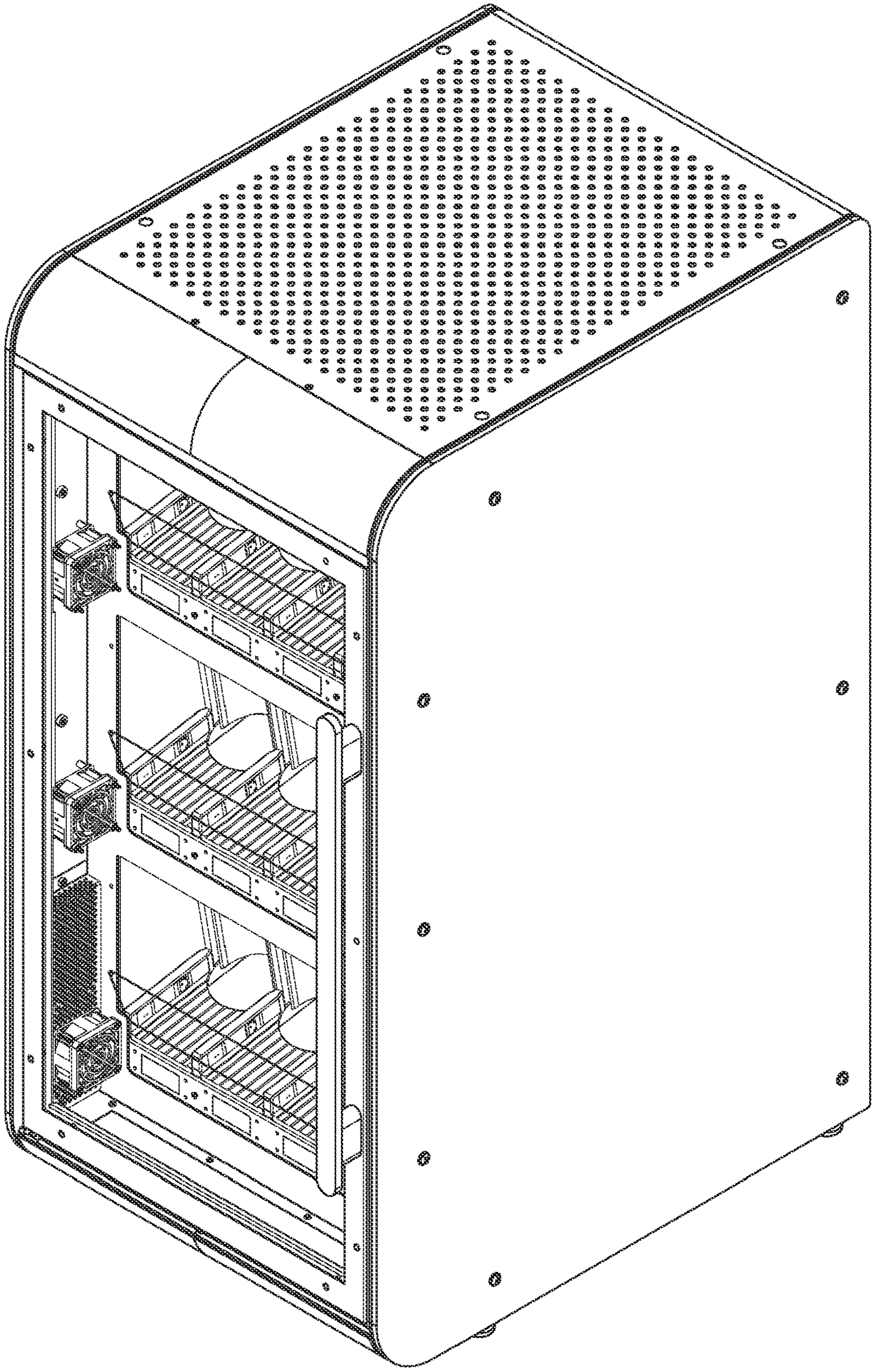
FIG. 15 is a perspective view of the beverage warmer design with a transparent front surface.
Figure 16:
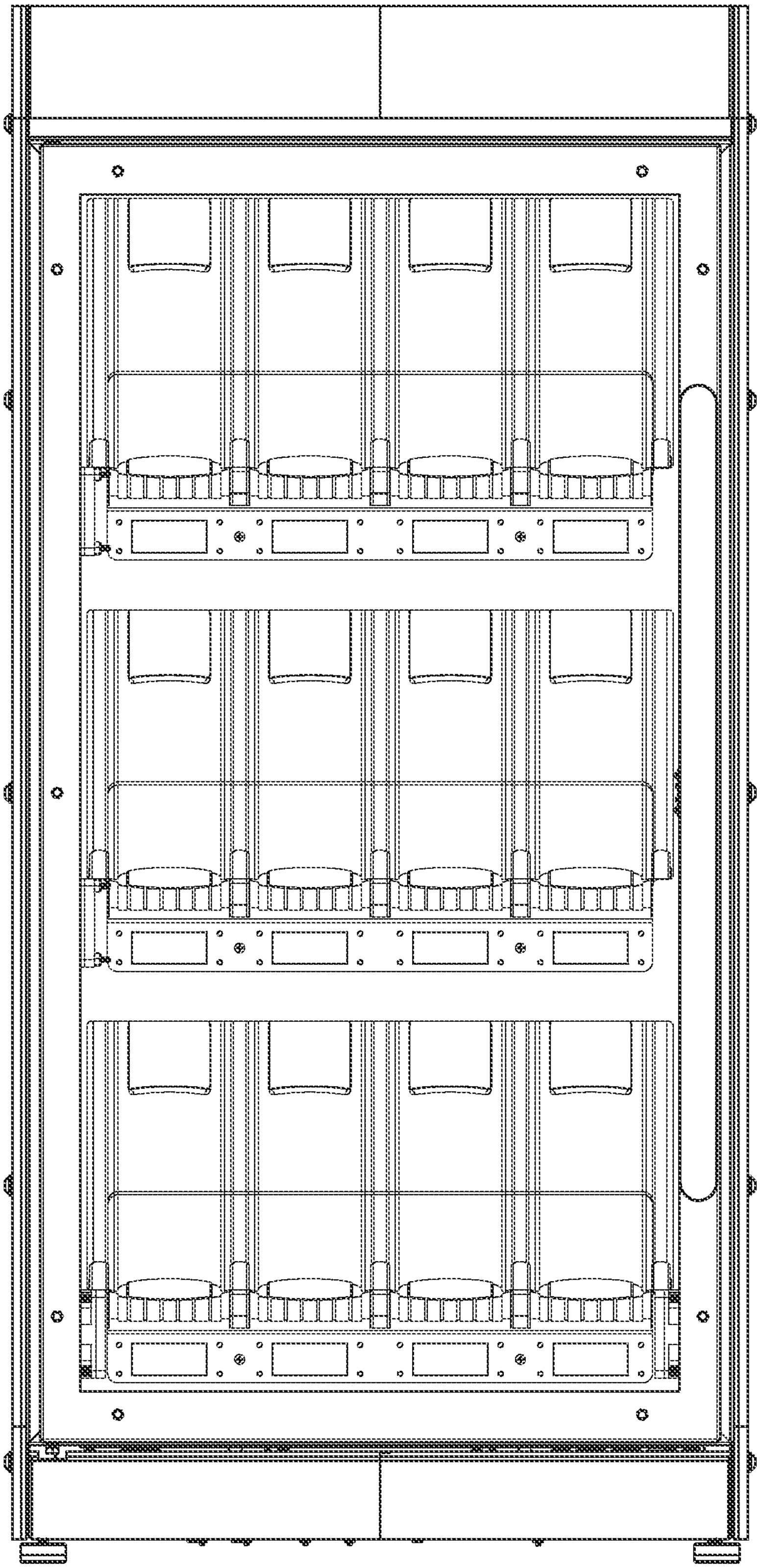
FIG. 16 is a front elevation view of the beverage warmer design with the transparent front surface.

FIGS. 8-16 show various views of a beverage warmer design. FIG. 8 is a perspective view showing a first embodiment of a new beverage warmer design. FIG. 9 is a front elevational view of the beverage warmer design. FIG. 10 is a first side elevation view of the beverage warmer design. FIG. 11 is a second side elevation view of the beverage warmer design. FIG. 12 is a top view of the beverage warmer design. FIG. 13 is a bottom view of the beverage warmer design. FIG. 14 is a back elevation view of the beverage warmer design. FIG. 15 is a perspective view of the beverage warmer design with a transparent front surface. FIG. 16 is a front elevation view of the beverage warmer design with the transparent front surface.

Figure 7:
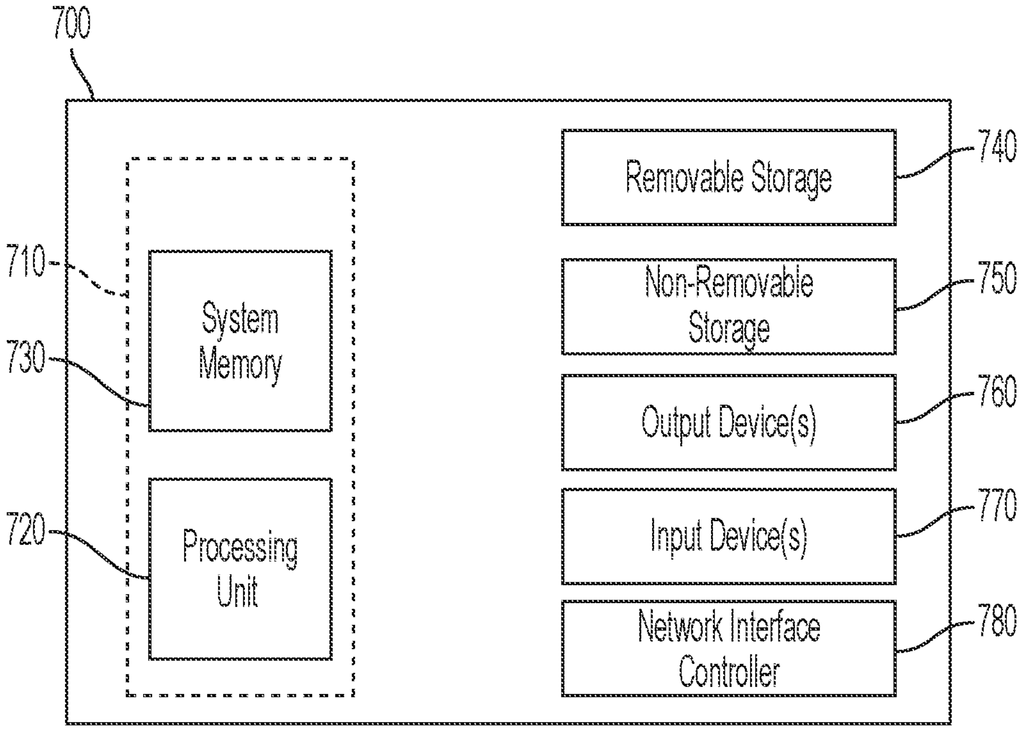
FIG. 7 illustrates an exemplary computer system suitable for implementing the several embodiments of the disclosure.

FIG. 7 illustrates an exemplary computer system 700 suitable for implementing the several embodiments of the disclosure. For example, one or more components or controller components of the beverage dispenser 504 may be implemented as the computer system 700. In some implementations, one or both of the HMI 1004 and the CDM 1006 may be implemented as the computer system 700.

It should be appreciated that the logical operations described herein with respect to the various figures may be implemented (1) as a sequence of computer implemented acts or program modules (i.e., software) running on a computing device (e.g., the computing device described in FIG. 7), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 7, an example computing device 700 upon which embodiments of the invention may be implemented is illustrated. For example, each of the main controller 144 and the lane controllers 306 may be implemented as a computing device, such as computing device 700. It should be understood that the example computing device 700 is only one example of a suitable computing environment upon which embodiments of the invention may be implemented. Optionally, the computing device 700 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 700 to provide the functionality of a number of servers that is not directly bound to the number of computers in the computing device 700. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 700 typically includes at least one processing unit 720 and system memory 730. Depending on the exact configuration and type of computing device, system memory 730 may be volatile (such as random access memory (RAM)), non-volatile (such as read-only memory (ROM), flash memory, etc.), or some combination of the two. This most basic configuration is illustrated in FIG. 7 by dashed line 710. The processing unit 720 may be a standard programmable processor that performs arithmetic and logic operations necessary for operation of the computing device 700. While only one processing unit 720 is shown, multiple processors may be present. Thus, while instructions may be discussed as executed by a processor, the instructions may be executed simultaneously, serially, or otherwise executed by one or multiple processors. The computing device 700 may also include a bus or other communication mechanism for communicating information among various components of the computing device 700.

Computing device 700 may have additional features/functionality. For example, computing device 700 may include additional storage such as removable storage 740 and non-removable storage 750 including, but not limited to, magnetic or optical disks or tapes. Computing device 700 may also contain network connection(s) 780 that allow the device to communicate with other devices such as over the communication pathways described herein. The network connection(s) 780 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 700 may also have input device(s) 770 such as a keyboard, keypads, switches, dials, mice, track balls, touch screens, voice recognizers, card readers, paper tape readers, or other well-known input devices. Output device(s) 760 such as a printer, video monitors, liquid crystal displays (LCDs), touch screen displays, displays, speakers, etc. may also be included. The additional devices may be connected to the bus in order to facilitate communication of data among the components of the computing device 700. All these devices are well known in the art and need not be discussed at length here.

The processing unit 720 may be configured to execute program code encoded in tangible, computer-readable media. Tangible, computer-readable media refers to any media that is capable of providing data that causes the computing device 700 (i.e., a machine) to operate in a particular fashion. Various computer-readable media may be utilized to provide instructions to the processing unit 720 for execution. Example tangible, computer-readable media may include, but is not limited to, volatile media, non-volatile media, removable media, and non-removable media implemented in any method or technology for storage of information such as computer readable instructions, data structures, program modules or other data. System memory 730, removable storage 740, and non-removable storage 750 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 720 may execute program code stored in the system memory 730. For example, the bus may carry data to the system memory 730, from which the processing unit 720 receives and executes instructions. The data received by the system memory 730 may optionally be stored on the removable storage 740 or the non-removable storage 750 before or after execution by the processing unit 720.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

ADDITIONAL EXAMPLES

1. A method of operating a beverage warmer based on a machine learning model of predicted demand patterns, comprising:

training a machine learning model that predicts a demand pattern for a future demand period, wherein training the machine learning model is based on a cost function that is a function of a ratio of a cost of a missed customer to a cost of a discarded product;

operating a beverage warmer based on the predicted demand pattern.

2. The method of example 1, wherein the machine learning model is a random forest regression model.

3. The method of example 2, wherein the cost of a missed customer is greater than a cost of a discarded product.

4. The method of example 3, wherein a cost function for split decisions in the random forest regression model is:

$$\text{Regression: } P(CR*\sigma\_D),$$

where CR is the ratio, σ_D is a standard deviation of historical demand for the demand period, and P is the baseline demand prediction based on historical demand data for the demand period.

5. The method of example 2, wherein the cost of a missed customer is less than a cost of a discarded product.

6. The method of example 5, wherein a cost function for split decisions in the random forest regression model is:

$$\text{Regression: } P-(CR*\sigma_D),$$

where CR is the ratio, σ_D is a standard deviation of historical demand for the demand period, and P is the baseline demand prediction based on historical demand data for the demand period.

7. The method of example 1, wherein operating the beverage warmer comprises transporting a product from an ambient storage zone to a heating zone to heat the product based on the demand pattern.

8. The method of example 1, wherein operating the beverage warmer comprises maintaining a product in an ambient storage zone without heating the product based on the demand pattern predicting a period of low demand.

What is claimed is:

1. A beverage warmer, comprising:

a product shelf with an ambient storage zone, a heating zone, and a serving zone, wherein the product shelf comprises a first door between the ambient storage zone and the heating zone and a second door between the heating zone and the serving zone, each of the first and second doors configurable between an open and a closed position; and a controller configured to:

input, into a generated machine learning model, current condition data, wherein the current condition data comprises a spoilage behavior of a first product of the beverage warmer;

generate, using the generated machine learning model, a demand prediction associated with the first product in the beverage warmer;

detect that the first product is removed from the serving zone; and selectively operate, based on the demand prediction, the first door to transport a second product from the ambient storage zone through the heating zone and to selectively operate, based on the demand prediction, the second door to transport the second product from the heating zone to the serving zone, wherein, if the controller determines that a current time is a low demand period, the controller is configured to responsively determine not to transport the second product through the first door from the ambient storage zone to the heating zone.

2. The beverage warmer of claim 1, wherein the serving zone comprises a serving area sized to receive a first number of products.

3. The beverage warmer of claim 2, wherein the ambient storage zone comprises a loading area sized to receive a second number of products.

4. The beverage warmer of claim 3, wherein the second number of products is greater than the first number of products.

5. The beverage warmer of claim 3, wherein the heating zone comprises a heating area sized to receive a single product.

6. The beverage warmer of claim 1, wherein the serving zone comprises a proximity sensor configured to detect whether a product is present at a location in the serving zone.

7. The beverage warmer of claim 6, wherein the controller is configured to determine that a product has been removed from the serving zone in response to the proximity sensor detecting that a product is not present at the location after detecting that a product is present at the location.

8. The beverage warmer of claim 7, wherein the controller is further configured to operate the first door to transport a product from the ambient storage zone to the heating zone in response to determining that a product has been removed from the serving zone.

9. The beverage warmer of claim 1, wherein the second door comprises a wall with a portal therethrough, wherein the portal is positioned on a top portion of the wall.

10. The beverage warmer of claim 1, wherein the product shelf further comprises a plurality of product lanes, each of the plurality of product lanes extend through the ambient storage zone, the heating zone, and the serving zone.

11. The beverage warmer of claim 10, further comprising: a plurality of product shelves.

12. A method of operating a beverage warmer, comprising:

inputting, into a generated machine learning model of a controller, current condition data, wherein the current condition data comprises a spoilage behavior of a first product of the beverage warmer;

generating, using the generated machine learning model, a demand prediction associated with the first product in the beverage warmer;

receiving the first product in a loading area of a product lane on a product shelf of the beverage warmer;

transporting the first product through a first door from the loading area to a heating area based on the demand prediction;

heating the first product in the heating area for a heating time at a heating temperature;

transporting the first product through a second door from the heating area to a serving area based on the demand prediction after the heating time;

maintaining the first product at a serving temperature in the serving area;

detecting that the first product is removed from the serving area; and determining that a current time is during a low demand period, and responsively determining, based on the demand prediction, to not transport a second product through the first door from the loading area to the heating area.

13. The method of claim 12, further comprising:

detecting whether the second product is in the loading area of the product lane;

detecting that the first product is removed from the serving area, and responsively transporting the second product through the first door from the loading area to the heating area.

14. The method of claim 12, wherein heating the first product in the heating area comprises heating the first product with one or more heating elements in the heating area.

15. The method of claim 14, wherein the one or more heating elements comprises two heating elements are positioned on opposite sides of the heating area.

16. The method of claim 14, further comprising: heating air in the serving area to the serving temperature with one or more heating elements in a serving zone that comprises the serving area.

17. The method of claim 16, further comprising: circulating the heated air in the serving area with one or more fans positioned in the serving zone.

18. The method of claim 12, further comprising: detecting that no products are present in the serving area; displaying a time on a display adjacent to the serving area, wherein the time indicates an amount of time remaining until a heated product is transported through the second door from the heating area to the serving area.

19. The method of claim 12, wherein transporting the first product through the first door comprises rotating the first door and transporting the first product through the second door comprises rotating the second door.

* * * * *